US011181211B1

(12) United States Patent
Morgan

(10) Patent No.: US 11,181,211 B1
(45) Date of Patent: Nov. 23, 2021

(54) TRUSS, JOIST AND STRUT CHANNEL MOUNTED SUPPORT SYSTEM

(71) Applicant: Robert Elliott Morgan, Cullman, AL (US)

(72) Inventor: Robert Elliott Morgan, Cullman, AL (US)

(*) Notice: Subject to any disclaimer, the term of this patent is extended or adjusted under 35 U.S.C. 154(b) by 0 days.

(21) Appl. No.: 16/906,559

(22) Filed: Jun. 19, 2020

Related U.S. Application Data

(60) Provisional application No. 62/866,346, filed on Jun. 25, 2019, provisional application No. 62/978,030, filed on Feb. 18, 2020.

(51) Int. Cl.
*F16M 13/02* (2006.01)
*F16L 3/24* (2006.01)

(52) U.S. Cl.
CPC ............. *F16L 3/24* (2013.01); *F16M 13/022* (2013.01); *F16M 2200/021* (2013.01)

(58) Field of Classification Search
CPC combination set(s) only.
See application file for complete search history.

(56) References Cited

U.S. PATENT DOCUMENTS

| 347,489 A | 8/1886 | Kenway |
| 470,102 A | 3/1892 | Canby |
| 535,707 A | 3/1895 | MacTaggart |
| 702,704 A | 6/1902 | Carli |
| 948,902 A | 2/1910 | Noyes |
| 981,470 A | 1/1911 | Postel |
| 989,808 A | 4/1911 | Rockwood et al. |
| 1,011,294 A | 12/1911 | Warrick |
| 1,132,999 A | 3/1915 | Beers |
| 1,134,519 A | 4/1915 | Dietrich |
| 1,230,441 A | 6/1917 | Stevens |
| 1,281,531 A | 10/1918 | Dietrich |
| 1,303,424 A | 5/1919 | Wahlberg |
| 1,352,895 A | 9/1920 | Hoffman |
| 1,470,642 A | 10/1923 | Ready |
| 1,604,590 A | 10/1926 | McNulty |
| 1,652,695 A | 11/1927 | Barber |
| 1,670,902 A | 5/1928 | Popps |
| 1,795,808 A | 3/1931 | Thompson |
| 1,832,315 A | 11/1931 | McNulty |
| 1,894,895 A | 1/1933 | Steele et al. |
| 2,470,991 A | 5/1949 | Kindorf et al. |
| 2,944,781 A | 7/1960 | Masters |

(Continued)

*Primary Examiner* — Monica E Millner
(74) *Attorney, Agent, or Firm* — Erickson Kernell IP, LLC; Kent R. Erickson

(57) ABSTRACT

A hanger support for use in association with a strut channel or with truss or joists formed from pairs of angle irons includes a stem and arms extending outward from the stem with a hole extending through the stem to receive a threaded rod or bolt. The hanger support is sized to pass lengthwise through the gap between pairs of angle irons of the truss and then rotated ninety degrees so that the arms are supported on the angle irons with the threaded rod or bolt extending through the gap and below the angle irons to support a hanger. The stem is also sized to fit in the space between shoulders of a strut channel. A second embodiment includes a lip depending from one of the arms to form a groove between the lip and stem with a set screw secured within a threaded bore in the lip.

20 Claims, 18 Drawing Sheets

(56) References Cited

U.S. PATENT DOCUMENTS

| | | | |
|---|---|---|---|
| 2,954,200 A | 9/1960 | Gannon et al. | |
| 3,292,888 A | 12/1966 | Fischer | |
| 4,700,917 A | 10/1987 | Dillman | |
| 4,973,021 A | 11/1990 | Schuite | |
| 5,104,079 A | 4/1992 | Hardtke | |
| 5,595,363 A | 1/1997 | De Leebeeck | |
| 6,224,025 B1 | 5/2001 | Alvarez | |
| 6,557,807 B1 | 5/2003 | Belanger | |
| 6,672,018 B2* | 1/2004 | Shingleton | H02S 20/23 52/173.3 |
| 7,410,140 B2 | 8/2008 | Hartwick | |
| 7,410,141 B2 | 8/2008 | Hartwick | |
| 7,434,362 B2* | 10/2008 | Liebendorfer | F24S 25/33 52/173.3 |
| 7,641,356 B2 | 1/2010 | Pieroth | |
| 8,096,518 B1 | 1/2012 | Morgan | |
| 8,344,239 B2* | 1/2013 | Plaisted | F24S 25/35 136/251 |
| 9,121,545 B2* | 9/2015 | Stanley | F24S 25/70 |
| 9,506,600 B1* | 11/2016 | Li | F24S 25/65 |
| 9,831,818 B2* | 11/2017 | West | F24S 25/67 |
| 9,985,575 B2* | 5/2018 | Stearns | F24S 25/40 |
| 10,605,282 B1* | 3/2020 | Young | F16B 5/025 |
| 10,644,643 B2* | 5/2020 | Stearns | H02S 20/23 |
| 2003/0101662 A1* | 6/2003 | Ullman | H02S 20/23 52/27 |
| 2003/0127579 A1 | 7/2003 | Olexovitch | |
| 2009/0008514 A1 | 1/2009 | Panasik et al. | |
| 2010/0230550 A1 | 9/2010 | Powers, III | |
| 2011/0036028 A1* | 2/2011 | Beck | F24S 25/636 52/173.3 |
| 2011/0138585 A1* | 6/2011 | Kmita | F24S 25/636 24/522 |
| 2011/0214365 A1* | 9/2011 | Aftanas | F24S 25/636 52/173.3 |
| 2015/0040967 A1* | 2/2015 | West | H02S 20/24 136/251 |
| 2015/0102194 A1* | 4/2015 | Liu | F24S 25/35 248/316.1 |
| 2015/0218822 A1* | 8/2015 | Blazley | E04D 3/18 52/173.3 |
| 2018/0322815 A1* | 11/2018 | White | G09F 7/18 |
| 2019/0081587 A1* | 3/2019 | Mayfield | H02S 20/23 |

* cited by examiner

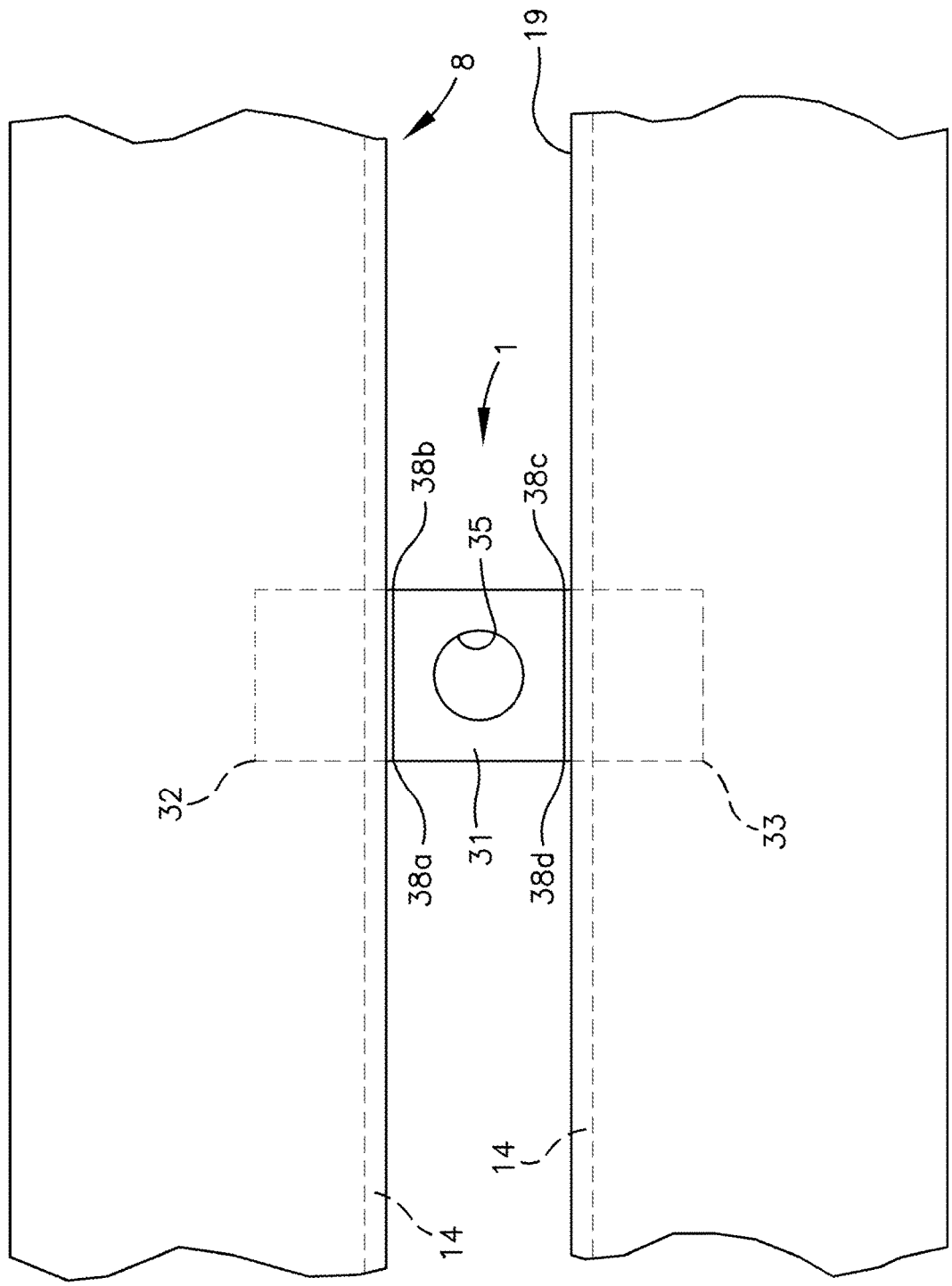

TRUSS, JOIST AND STRUT CHANNEL MOUNTED SUPPORT SYSTEM

CROSS-REFERENCE TO RELATED APPLICATIONS

This application claims the benefit of U.S. Provisional Patent Application No. 62/866,346, filed Jun. 25, 2019 and U.S. Provisional Patent Application No. 62/978,030, filed Feb. 18, 2020, the disclosures of which are hereby incorporated herein in their entirety by reference.

BACKGROUND OF THE INVENTION

Field of the Invention

The present invention relates generally to hanger supports for hanging pipes, conduit, strut channels, cables or other materials from support structures such as trusses, joists or strut channels. More particularly, the present invention relates to a hanger support that is sized and shaped to facilitate installation between the gap of angle irons used to form trusses and web joist and the space between the upright legs of strut bars or channels.

Description of the Related Art

Support structures, such as trusses or joists, may comprise a first length of angle iron having a first vertical flange projecting vertically upward from a first horizontal flange, and a second length of angle iron having a second vertical flange, oriented parallel to the first vertical flange, and projecting vertically upward from a second horizontal flange. The horizontal flanges of the angle irons project horizontally outward relative to each other so that the vertical flanges may be placed as close to each other as desired. Typically, the vertical flanges are spaced apart to create a channel or gap for receiving joist and truss webbing.

Devices for hanging materials from trusses and joists typically include a clamping device for secure attachment to a truss element, such as a vertical or horizontal flange, and a hanger attached to, and depending from, the clamping device for receiving material to be stored or retained, such as pipe or conduit. Such clamping devices can be cumbersome to install, however, particularly if the hanger must be positioned and secured at the same time the clamping device is attached to the support structure.

SUMMARY OF THE INVENTION

The purpose of this invention is to provide an improved hanger support system that allows materials such as electrical conduit, cable, water pipes, gas pipes, lumber, or strut channels to be suspended from, or attached to, existing building support elements such as conventional trusses or joists with parallel rails or support members. It is also a purpose of the invention to permit concentric hanging of products, such as conduits, ducts or equipment from trusses, joists or struts to avoid applying excessive torque to horizontal flanges of the angle irons forming the truss or on just one of the vertical flanges.

Disclosed is a hanger support adapted for use in association with a strut channel formed from a single u-shaped piece of metal and/or a truss or joist formed from upper and lower pairs of angle irons, a first angle iron of each of the upper and lower pairs of angle irons have a vertical leg disposed substantially longitudinally parallel to a vertical leg of a second angle iron of each of the upper and lower pairs of angle irons with a gap formed therebetween. One embodiment of the hanger support, which may be described as T-shaped, includes a stem and first and second arms extending laterally outward relative to said stem and with a bore extending through the hanger support in axial alignment with a central axis of the stem.

The hanger support, including the stem, having a maximum transverse width that is narrower than the width of the gap between vertical legs of the angle irons. The stem having a maximum longitudinal width that is narrower than the width of the gap. The stem having at least first and second abutment features, or corners, projecting radially outward from the central axis of the stem at an acute angle relative to and on opposite sides of a longitudinal axis through the stem. Each of the abutment features extending radially outward from the central axis of the stem by a distance that exceeds half the width of the gap. The hanger support may be passed through the gap between the vertical legs of the first and second angle irons of the upper or lower pairs of angle irons when the hanger support is oriented with the longitudinal axis of the hanger support extending parallel to a longitudinal axis of the gap and when the hanger support is subsequently rotated ninety degrees, the stem may be positioned to extend within the gap and the first and second arms extend over the vertical legs of the first and second angle irons of the upper or lower pairs of angle irons. The first and second abutment features engage the vertical leg of a first of the first or second angle iron upon rotation of the hanger support about the central axis of said stem to limit rotation of said hanger support relative to the first and second angle irons.

In one embodiment, the stem has a square cross-section with diagonals that are longer than the gap formed between the vertical legs of the upper and lower pairs of angle irons. The hanger support has a maximum transverse width that is narrower than the width of the gap and a length along a longitudinal axis that is longer than the width of the gap such that the hanger support may be passed upward through the gap between the vertical legs of the first and second angle irons of a pair of angle irons when the hanger support is oriented with the longitudinal axis of the hanger support extending parallel to a longitudinal axis of the gap and when the hanger support is subsequently rotated ninety degrees, the first and second arms extend over the vertical legs of the first and second angle irons of the upper or lower pairs of angle irons. The corners of the stem, along the diagonals, function as abutment features which abut against the vertical legs of the angle irons forming the gap when the stem of the hanger support is positioned in the gap and the hanger support is rotated relative to the angle irons to prevent further rotation of the hanger support relative to the angle irons. The stem is preferably shorter than a depth of the gap between the vertical legs of the first and second angle irons of the upper or lower pairs of angle irons. In one alternative embodiment, each of the first and second arms has a magnet embedded therein to fixedly secure the hanger support to the angle irons of a truss or joist or strut channel on which it is supported. In another alternative embodiment, connector receiving holes may be formed through either or both arms.

Another embodiment of the hanger support has a lip depending from a distal end of one of the arms, forming a groove or channel between the stem and the lip. A threaded bore extends through the lip with a set screw or threaded connector threadingly secured within the threaded bore through the lip to allow clamping of the hanger support against a leg of an angle iron received within the groove.

Threading the set screw against an outer face of the leg draws the adjacent surface of the stem of the hanger support against the opposite face of the leg.

The hanger supports, of any of the embodiments described, preferably has a longitudinal width which allows the stem of the hanger support to be inserted in a space between shoulders of a strut channel. The strut channel is preferably of a type in which having a web and first and second spaced apart legs projecting transverse to the web on opposite sides thereof with the first and second shoulders extending inward from the first and second legs respectively. The groove between the stem and the lip of the hanger support is wide enough to receive either of the first or second legs and a respective first or second shoulder of the strut channel with the threaded bore in the lip extending in alignment with the first or second leg of the strut channel received within the groove.

One embodiment of the hanger support with stem, arms and lip depending from one of the arms is adapted for use with a strut channel of a type having a plurality of slots formed through the web of the strut channel in longitudinally spaced alignment. The longitudinal width of the stem is narrower than a transverse width of each of the plurality of slots so that the stem may be received within any of the slots with the lip extending along the outer surface of one of the legs of the strut channel.

The bore extending through the stem of the hanger supports may be smooth or threaded along at least a portion of its length. The hanger supports are preferably monolithic and may be formed from a variety of methods including metal powder molding or an extrusion and cutting process. The bore through the stem may be machined in or, if smooth may be formed in the molding process. The set screw receiving bore in the embodiments with the lip would be machined into the lip.

A lock washer with a rectangular body, a rectangular hole extending therethrough and a depending lip extending along one edge thereof may be used in combination with a carriage bolt and one of the hanger supports to prevent rotation of the carriage bolt relative to the hanger support.

BRIEF DESCRIPTION OF THE DRAWINGS

FIG. 37 is a greatly enlarged, bottom plan view showing the hanger support lowered into engagement with the vertical legs of the lower pair of angle irons as shown in FIG. 4 and after having been rotated ninety degrees relative to its orientation in FIG. 2.

DETAILED DESCRIPTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 12:
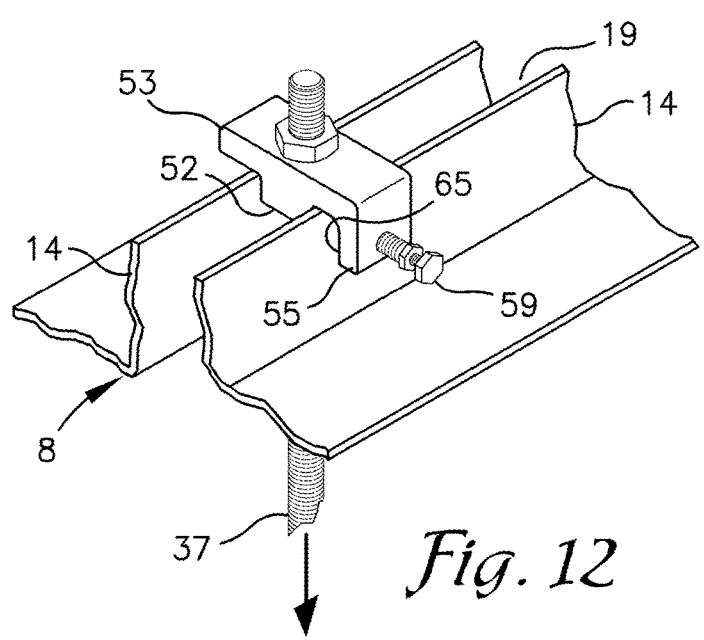
FIG. 12. is a view similar to FIG. 11 showing the hanger support lowered into engagement with the vertical legs of the lower pair of angle irons after having been rotated ninety degrees relative to its orientation in FIG. 10 and in which the vertical leg of one of the angle irons is received within a groove formed between the lip and the stem of the hanger support.

Referring now to FIGS. 1-7, a hanger support 1 is shown for supporting and hanging materials such as cables, pipes, conduits or strut channels from a support structure such as a joist or truss 3 or similar support structure such as a web joist. An alternative embodiment of a hanger support 51, as shown in FIGS. 8 and 12, is adapted for connecting materials such as cables, pipes or conduits to either a truss 3 or a slotted strut channel 4.

The hanger support 1 is particularly adapted for use with a commonly used type of joist or truss 3 comprising an upper pair of spaced apart, elongated angle irons 6 and a lower pair of spaced apart, elongated angle irons 8 connected together by an open web 11 formed from rigid tubing, or formed tubing or a rigid rod 12 extending back and forth between the upper and lower pairs of angle irons 6 and 8 for the length of the truss in a serpentine or sinusoidal type pattern. Each angle iron, in the upper and lower pairs 6 and 8 includes a vertical leg 14 and a horizontal leg 15. In both the upper and lower pairs of angle irons 6 and 8 the horizontal leg of each angle iron extends outward away from the horizontal leg 15 of the opposite angle iron. In the upper pair of angle irons 6, the vertical legs 14 extend downward from the horizontal legs 15 and in the lower pair of angle irons 8, the vertical legs 14 extend upward from the horizontal legs 15.

The web 11 for a given section of truss 3, of the embodiment shown, comprises a continuous length of metal rod 12. It is foreseen that the web 11 could be formed from multiple, discontinuous sections of rod or elongate members extending between the upper and lower pairs of angle irons 6 and 8 and between the vertical legs 14 thereof. Typically, the rod 12 is welded in place as it passes between the vertical legs 15 of the upper and lower pairs of angle irons 6 or 8 and forms a bend 18 between the vertical legs 15. At each upper bend 18 in the rod 12, the rod 12 is welded between the vertical legs 14 of the upper pair 6 of angle irons, and at each lower bend 18 in the rod 12, the rod 12 is welded between the vertical legs 15 of the lower pair of angle irons 8. A gap or channel 19 is thereby formed between the vertical legs 14 of each of the upper and lower pairs of angle irons 6 and 8. The width of the gap 19 is typically determined by the width or diameter of the rod 12 held between the lengths of angle iron. The width of the gap 19 in commercially available trusses 3 in the United States are typically one inch to one and a quarter inches wide. In a truss 3 with a one inch gap 19, the vertical and horizontal legs are approximately 1½ to 2 inches wide such that the depth of the gap would be approximately 1½ to two inches.

Figure 8:
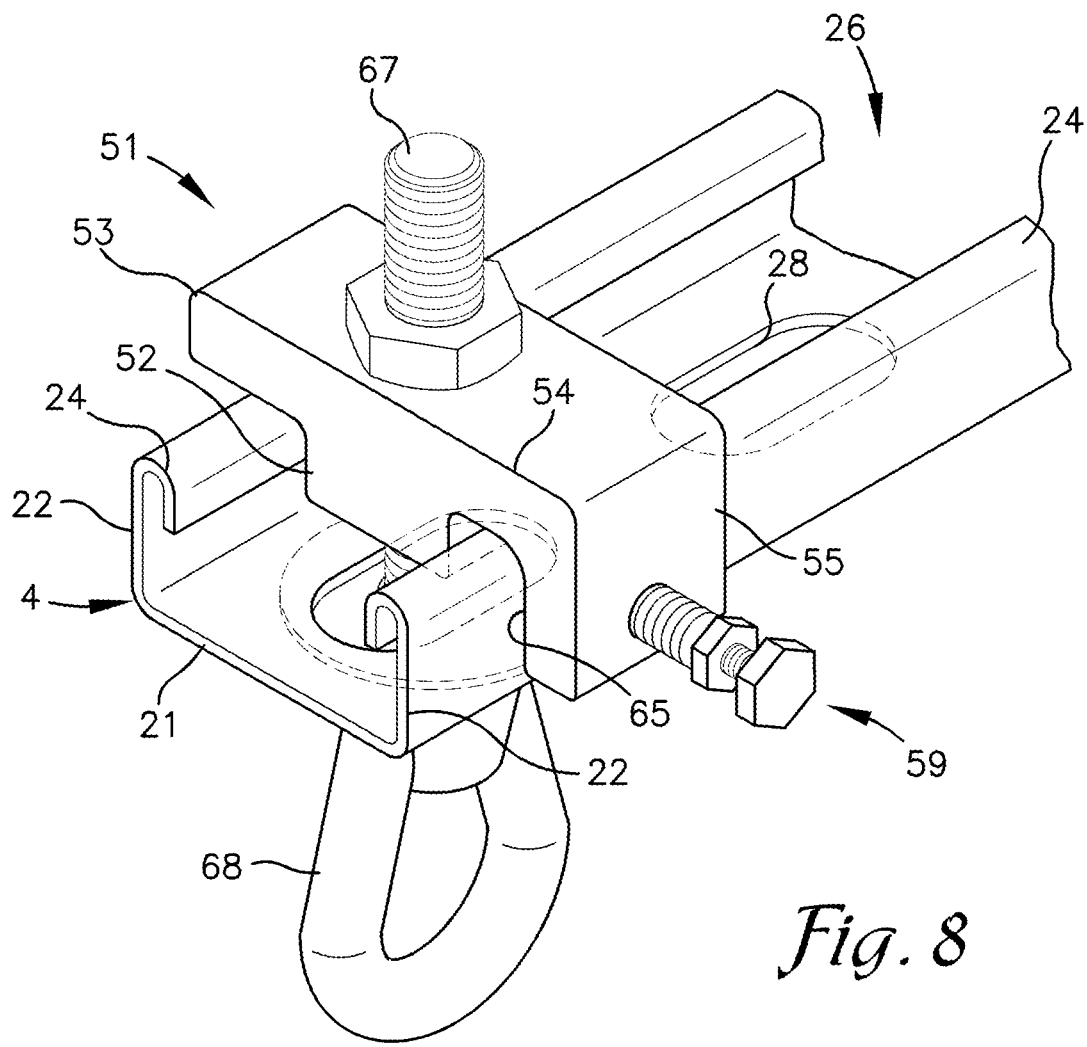
FIG. 8 is a perspective view of a channel strut having a hanger support of an alternative embodiment having a stem secured within a space between upstanding legs and inwardly turned shoulders of the channel strut wherein the hanger support includes a lip depending from a distal end of one of the arms of the hanger support.
Figure 10:
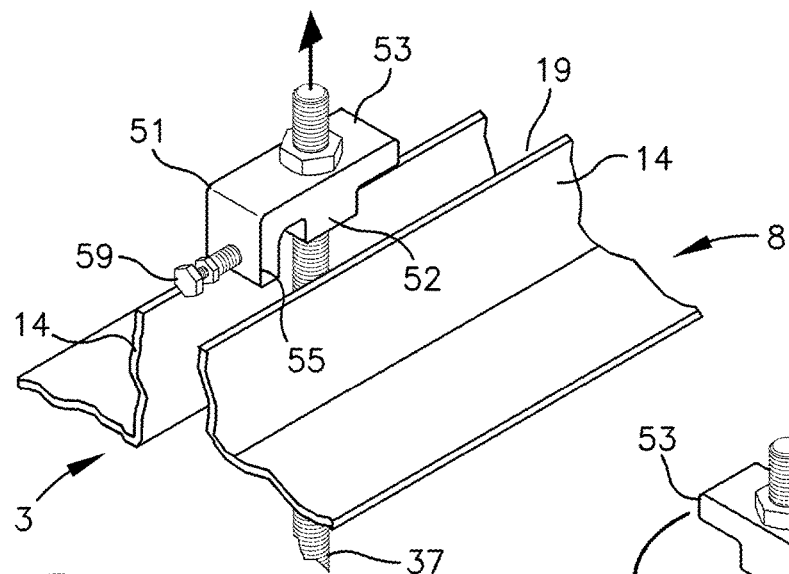
FIG. 10 is an enlarged and fragmentary perspective view of the lower pair of angle irons forming the truss or joist showing one of the hanger supports of the type shown in FIG. 8 being passed upward between vertical legs of the lower pair of angle irons forming the truss.
Figure 11:
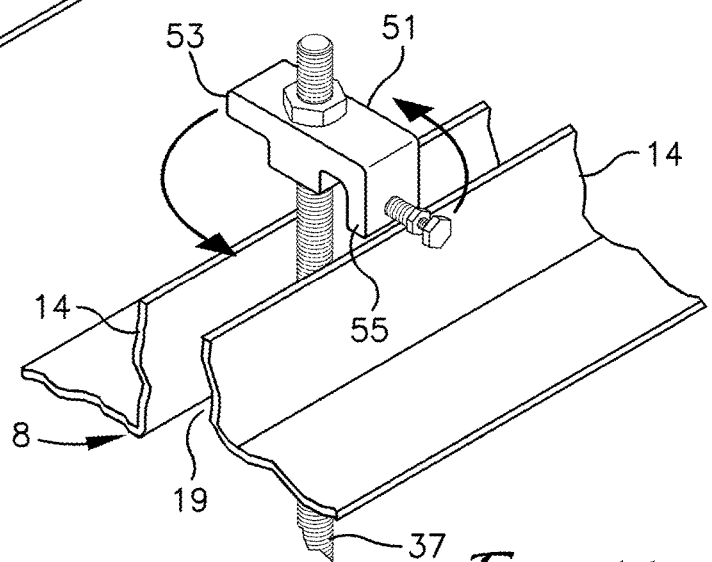
FIG. 11 is a view similar to FIG. 10 showing the hanger support being rotated ninety degrees.

With reference to FIGS. 8 and 10-11, the slotted strut channel 4 is generally U-shaped with a base or web 21 and a pair of legs 22 extending transverse to the web 21 to form the U-shape of the channel 4. The distal ends of the legs 22 are turned inward and then back toward the web 21 to form a shoulder 24. A gap or space 26 extending between the shoulders 24 is narrower than the space extending between the legs 22 from the inner surface of the web 21 to the bottom of the shoulders 24. A plurality of slots or openings 28 are punched or otherwise formed in and through the web 21 in equally spaced and axial alignment along the length of the channel 4. The slots 28 include at least two parallel sides extending lengthwise and parallel to the longitudinal axis of the channel 4. In a commonly available version of the slotted strut channel 4, the gap 26 between the shoulders is approximately ⅞ inches wide, the width of the slots 28 is approximately ⅝ inches, the overall width of the strut 4 is approximately 1⅝ inches, the width of each shoulder is approximately ⅜ inches and the spacing between the sides of each slot 28 and the outer edges of the strut 4 is approximately ½ inch.

Returning to FIG. 1, hanger support 1 is shown mounted on the lower pair of angle irons 8 of the truss 3 with a portion of the hanger support 1 supported above the lower pair of angle irons 8 and a portion extending between the vertical legs of the angle irons 8. The hanger support 1 shown is T-shaped with a stem 31 and laterally projecting arms 32 and 33 and a central hole 35 (see FIG. 5) extending through the hanger support in axial alignment with the stem 31. The central hole 35 may or may not be threaded and may be round or square in cross-section or other useful geometries. As best seen in FIG. 37 the cross-section of the stem 31, in the embodiment shown and in a plane extending perpendicular to a central axis of the stem through the central hole 35, is square. It is foreseen the cross section of the stem 31 could be rectangular or other geometries. As used herein, and consistent with its ordinary meaning a square is considered a rectangle. For example, the cross-section of the stem 31 could be a rectangle having a transverse width that is narrower than the longitudinal width. In the embodiment of the hanger support 1 shown supported on the lower pair of angle irons 8 in FIGS. 1-5, at least a portion or all of the central hole 35 is threaded so that a length of an all thread rod 37 may be secured to the hanger support 1 within the threaded central hole 35. The all thread rod 37 may be described as a hanger or a portion of a hanger.

The width of the hanger support 1, transverse to the direction that the arms 32 and 33 extend away from the stem 31, which may be referred to as the transverse width, is narrower than the width of the gap 19 between the vertical legs 14 of the angle iron pairs 6 and 8 and in a preferred embodiment the transverse width of the hanger support 1 is just slightly narrower than the width of the gap 19. In one example, the gap 19 is approximately one inch wide and the hanger support 1 is approximately ⅞ inches wide in the transverse direction. In the embodiment shown, the transverse width of the stem 31 is the same as the transverse width of the arms 32 and 33. The length of the hanger support 1, from end to end of the arms 32 and 33, is greater than the width of the gap 19 between vertical legs 14 of angle iron pairs 6 or 8, and the longitudinal width of the stem 31 is also preferably just slightly narrower than the width of the gap 19. The longitudinal width of the stem 31 may be the same as the transverse width of the stem 31 and in one embodiment, the longitudinal width of the stem 31 is slightly narrower than the transverse width of the stem 31. In the example in which the transverse width is ⅞ inches wide, the longitudinal width may be ⅞ inches wide. The longitudinal and transverse widths of the stem 31 are selected so that the diagonal between each set of opposed corners 38 is longer than the width of the gap 19 in which the stem 31 is to be inserted so that the stem 31 and the hanger support 1 as a whole cannot rotate more than a couple of degrees relative to the vertical legs 14 of the pairs of angle irons 6 or 8 forming the gap 19 when the stem 31 extends in the gap 19.

The arms 32 and 33, from the edge of the stem 31 to their distal ends are long enough to extend across the upper edges of the vertical legs 14 of the lower angel irons 8 when the stem 31 of the hanger support 1 is positioned in the gap 19 therebetween. In an embodiment for use with a gap 19 of one inch and a stem of approximately ⅞ inches wide in the transverse and longitudinal directions, the arms may extend past the edge of the stem 31 by approximately ¼ to ¾ inches and in one embodiment ⅝ inches. In one embodiment, the stem 31 is sized so that it only extends into a portion of the height of the gap 19 when supported on the upper or lower pairs of angle iron 6 and 8. For example, in the embodiment in which the gap 19 is one inch, and the vertical and horizontal legs 14 and 15 of angle iron pairs 6 and 8 are 1½ inches, the stem 31 preferably extends below the arms 32 and 33 approximately ⅜ of an inch to ½ an inch.

Figure 2:
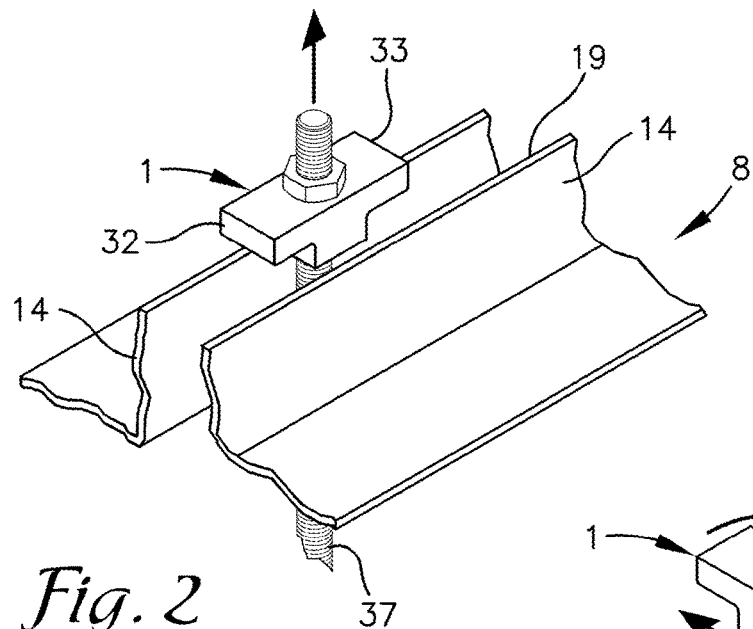
FIG. 2 is an enlarged and fragmentary perspective view of the lower pair of angle irons forming the truss or joist showing one of the hanger supports being passed upward between vertical legs of the lower pair of angle irons forming the truss.
Figure 3:
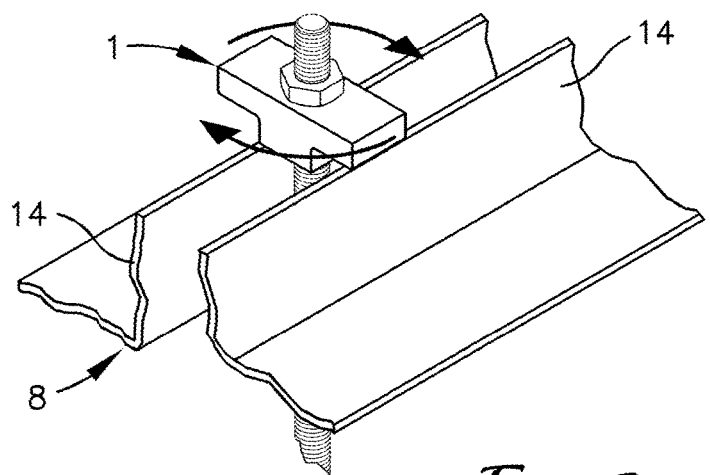
FIG. 3 is a view similar to FIG. 2 showing the hanger support being rotated ninety degrees.
Figure 4:
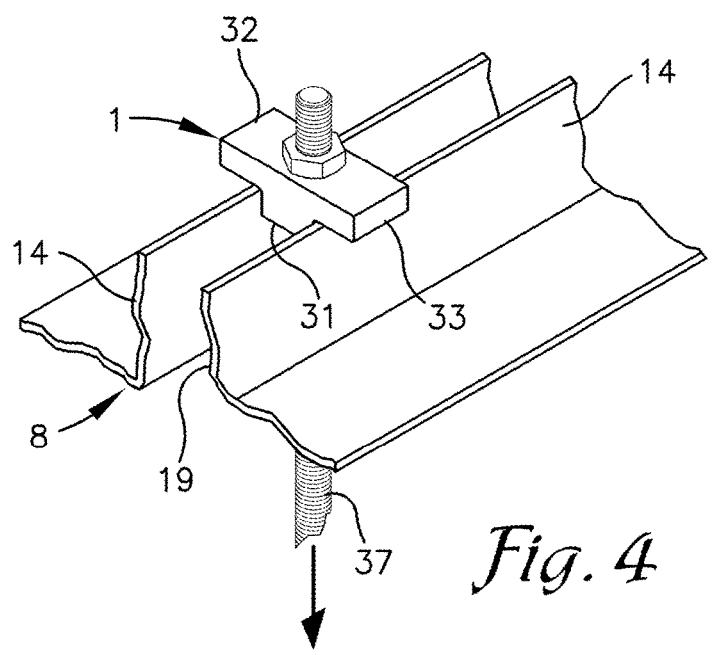
FIG. 4. is a view similar to FIG. 3 showing the hanger support lowered into engagement with the vertical legs of the lower pair of angle irons after having been rotated ninety degrees relative to its orientation in FIG. 2.
Figure 5:
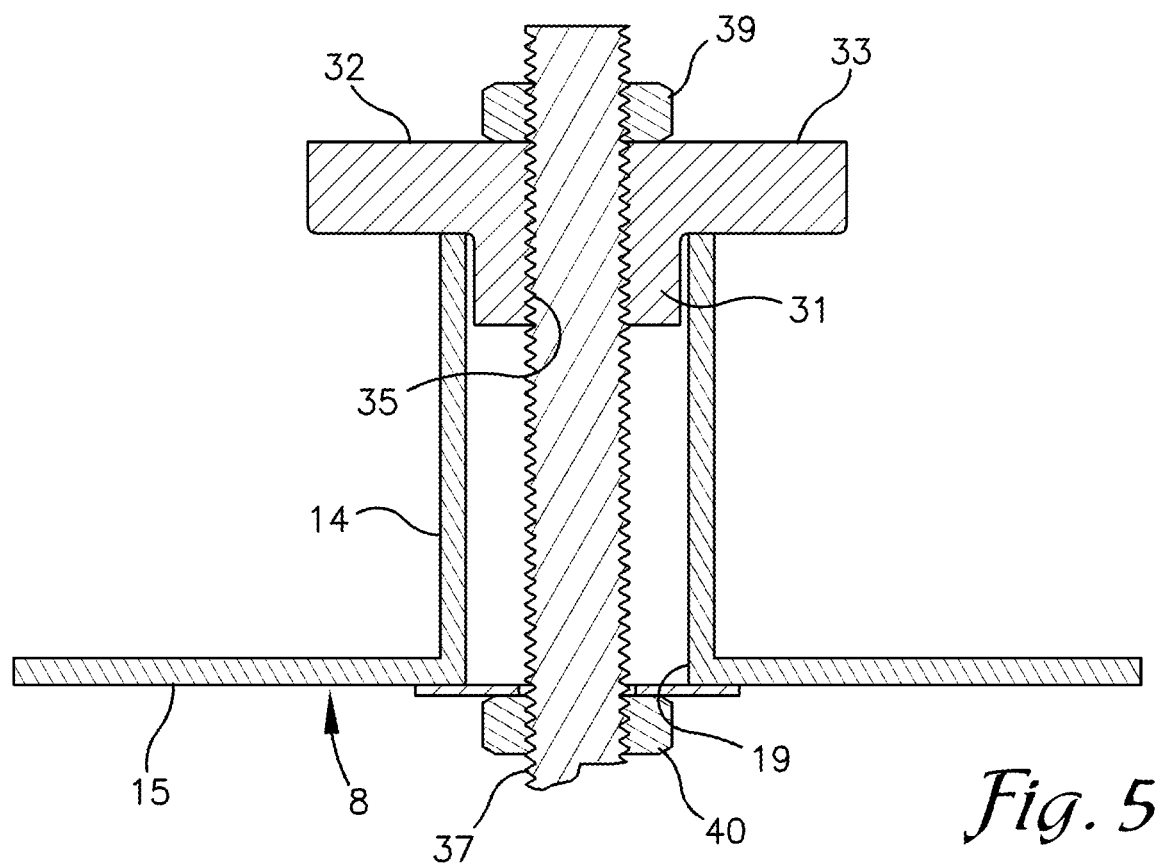
FIG. 5 is an enlarged and fragmentary, cross-sectional view taken along line 5-5 of FIG. 1.
Figure 36:
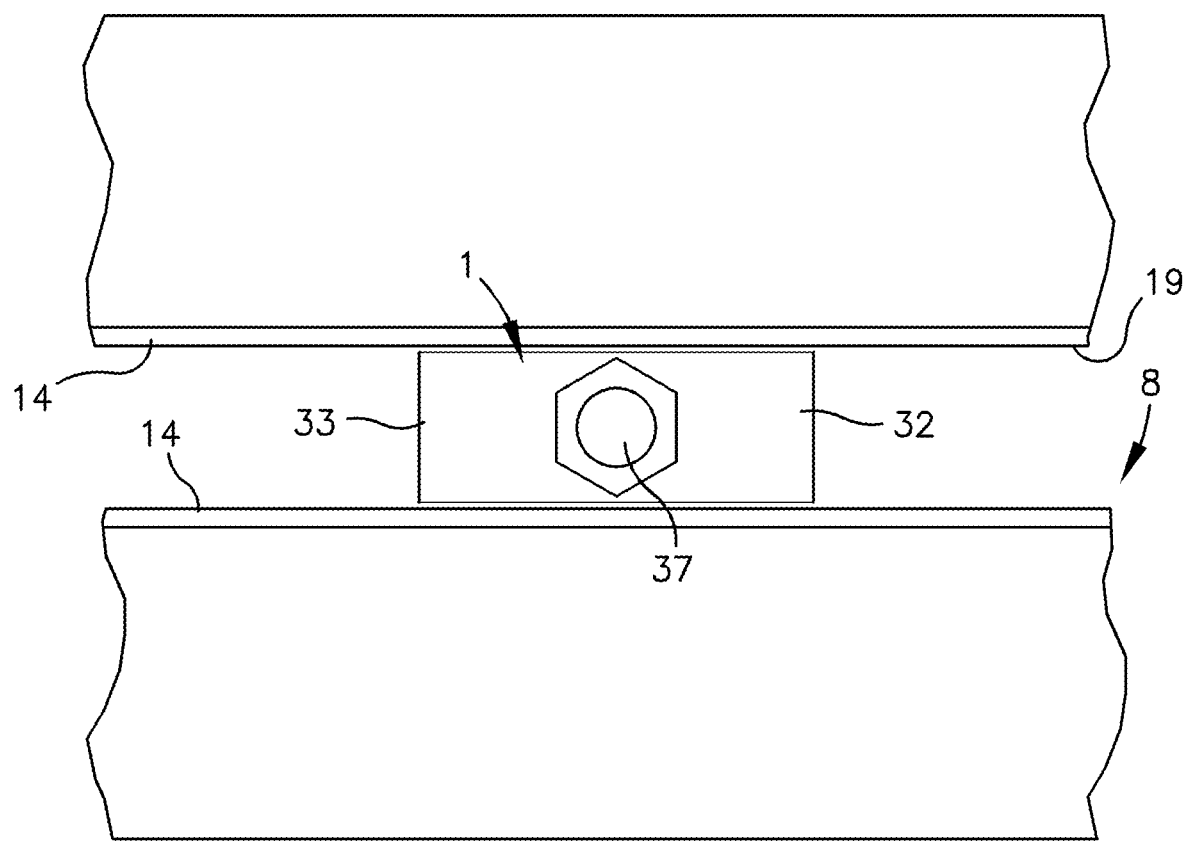
FIG. 36 is a greatly enlarged, top plan view showing one of the hanger supports being passed upward between vertical legs of the lower pair of angle irons forming the truss as shown in FIG. 2.

Referring to FIG. 5, one of the hanger supports 1 is shown threaded onto the end of an all thread rod 37 and a lock nut 39 is shown threaded onto the end of the all thread rod 37 above the hanger support 1 to keep the all thread rod 37 from rotating out from the hanger support 1. An additional lock nut 40, may be threaded onto the all thread rod 37 below the hanger support 1. To install the hanger support 1 on top of the lower angle irons 8, the hanger support 1 is rotated until the arms 32 and 33 extend in axial alignment with the gap 19 between the vertical legs 14 of lower angle irons 8 as generally shown in FIG. 36. The all thread rod 37 and attached hanger support 1 are then raised to advance the hanger support 1 upward through the gap 19 until a lower end of the stem 31 of hanger support 1 extends above the upper edge of the vertical legs 14 of the lower angle irons 8 as shown in FIG. 2. As depicted in FIG. 3, the all thread rod 37 is then rotated ninety degrees to rotate the hanger support 1 ninety degrees until the arms 32 and 33 of the hanger support 1 extend transverse to the gap 19 and over and across the upper edges of the vertical legs 14 of the lower angle irons 8. As depicted in FIG. 4, the all thread rod 37 and hanger support 1 are then lowered until the arms 32 and 33 rest on the upper edges of the vertical legs 14 of the lower angle irons 8 with the all thread rod or hanger 37 suspended from and supported by the hanger support 1 which in turn is supported on the lower angle irons 8. Referring to FIG. 37, the square stem 31 is shown positioned in the gap 19 between the vertical legs 14 of the lower angle irons 8. Rotation of the stem 31 of the hanger support 31 within the gap 19 is limited due to the close spacing between the opposed faces of the stem 31 extending transverse to the longitudinal axis of the hanger support 1 relative to the vertical legs 14 of lower angle irons 8 such that opposed corners 38 of the stem 31 will engage the vertical legs 14 after a very limited degree of rotation. The corners 38 may be referred to as abutment features of the stem 31. The all thread rod 37 is sized such that a pipe, conduit or cable support (not shown) can be threaded onto a lower end of the all thread rod 37 to support an article such as a pipe, conduit or cable (not shown) at a selected height below the truss 3.

Figure 1:
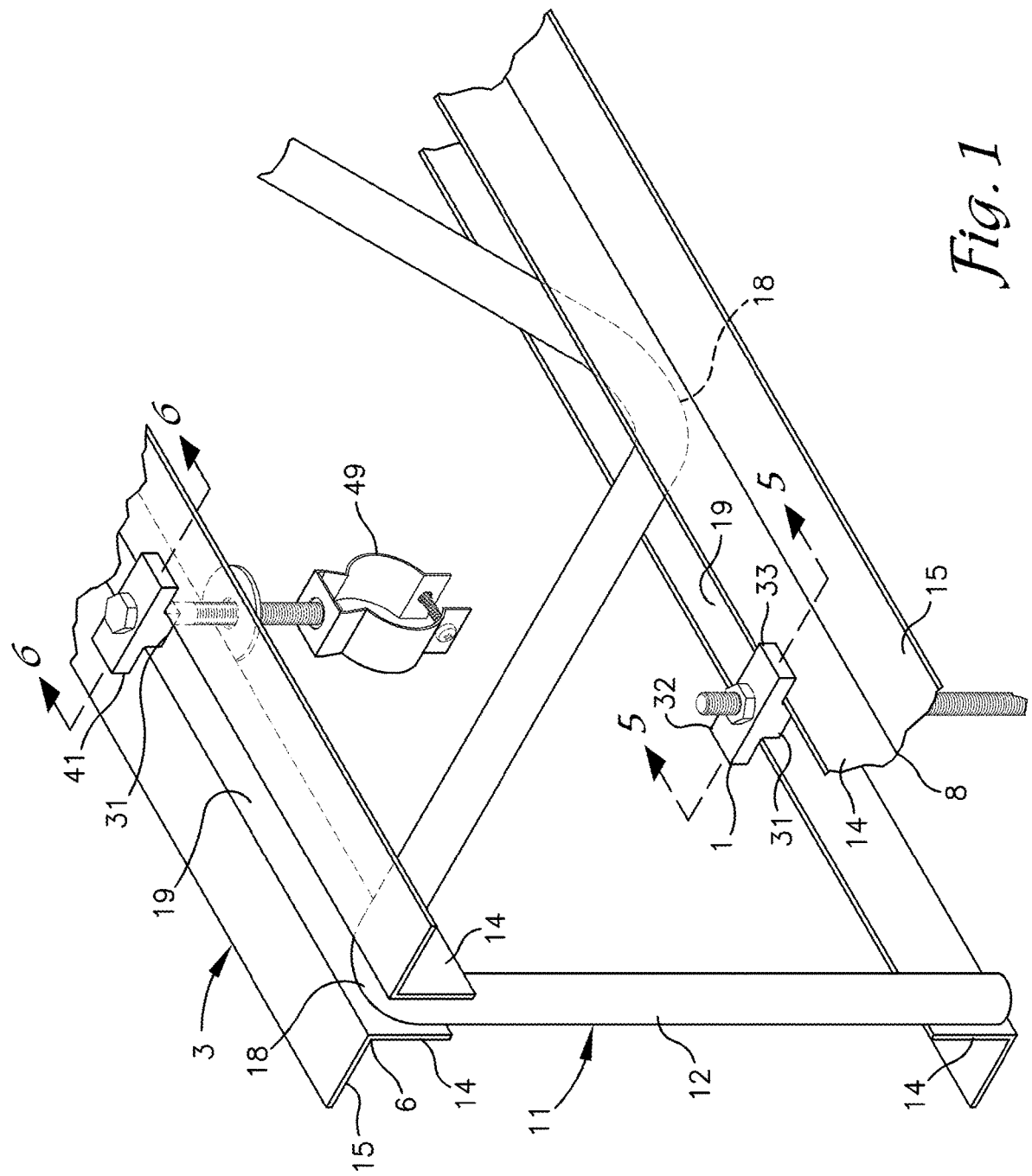
FIG. 1 is a fragmentary, perspective view of a truss with first and second T-shaped, hanger supports supported on lower and upper pairs of angles irons forming the truss or joist with threaded rods or bolts suspended from the hanger supports and a hanger connected to the threaded rod suspended from the hanger support supported on the upper pair of angle irons.
Figure 6:
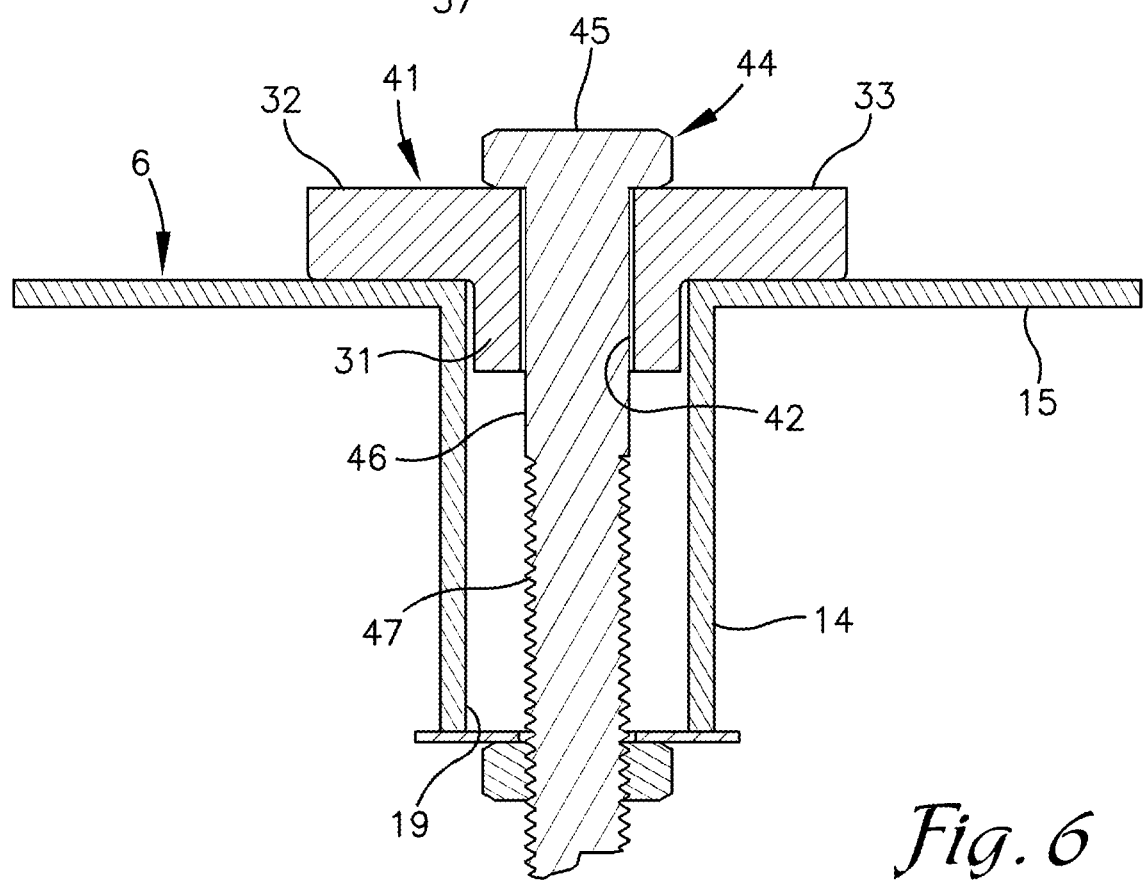
FIG. 6 is an enlarged and cross-sectional view taken along line 6-6 of FIG. 1.
Figure 7:
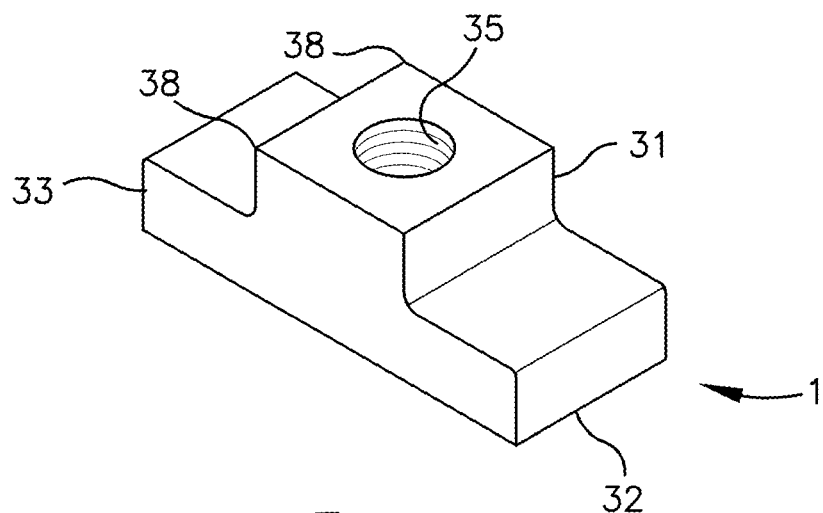
FIG. 7 is a perspective view of one of the T-shaped hanger supports of FIG. 1 shown with a bottom of the hanger support oriented upwards relative to the orientation of the hanger support in FIG. 1.

FIG. 1 also shows a hanger support 41, which is a slightly modified version of the hanger support 1, having a central hole 42 which is not threaded as shown in FIG. 6. Otherwise, hanger support 41 is constructed the same as hanger support 1 and the structure of hanger support 41 is given the same reference numbers as the corresponding structure in hanger support 1. The smooth, central hole 42 of hanger support 41, as shown in FIG. 6, is adapted to receive a bolt 44 (an alternative hanger or part of a hanger assembly) with an enlarged head 45, a smooth neck or shank 46 extending from the head 45 and a threaded section 47 at a distal end of the bolt 44. The shank 46 may be longer than the central hole 42. An installer, typically on a lift may position one of the hanger supports 41 to be supported on top of the upper angle irons 6, as shown in FIGS. 1 and 6, with the arms 32 and 33 of the hanger support 41 supported on the horizontal legs 15 of the upper angle irons 6 and the stem 31 extending into the gap 19 formed therebetween.

The installer then may insert the threaded section 47 and smooth shank 46 of a bolt 44 through the central hole 42 until the enlarged head 45 of the bolt 44 rests on the upper surface of the hanger support 41 as shown in FIG. 1 and FIG. 6. The length of the shank 46 and threaded section 47 of bolt 44 are preferably sized so that only a relative short length of the threaded section 47 extends below the upper angle irons 6. Referring to FIG. 1, a support bracket 49 forming part of a hanger assembly may, for example, then be threaded onto the threaded section 47 at the lower end of the bolt 44 for supporting a conduit (not shown) in the space between the upper and lower pairs of angle irons 6 and 8.

Figure 9:
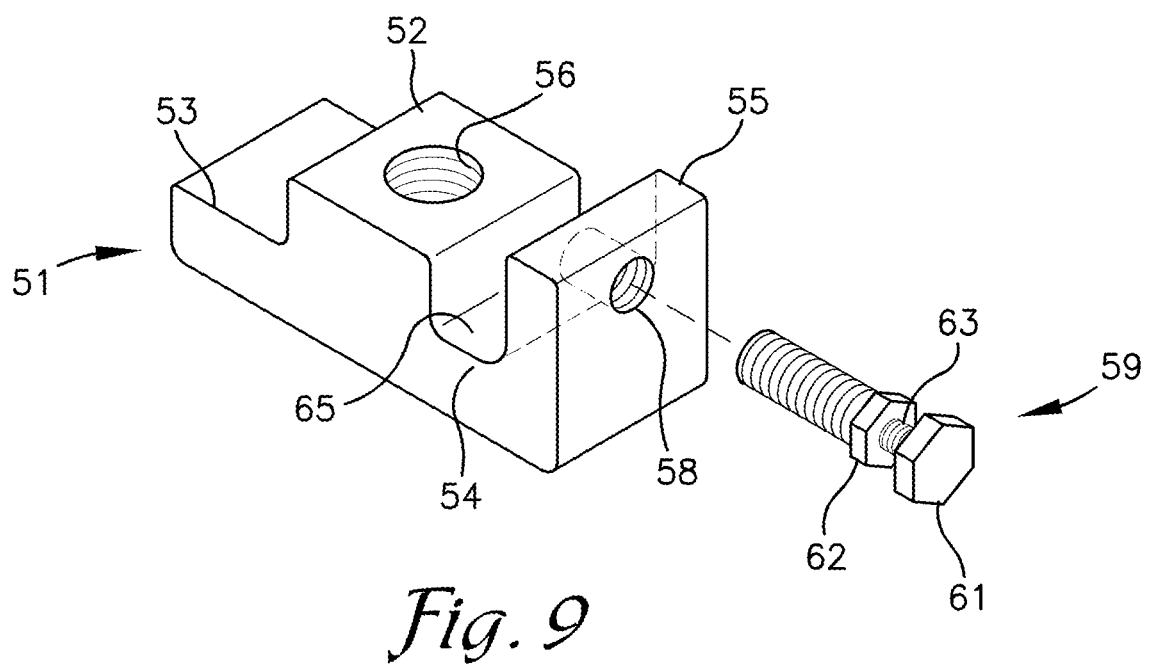
FIG. 9 is a perspective view of the hanger support of FIG. 8 shown with a stem or bottom of the hanger support oriented upwards relative to the orientation of the hanger support in FIG. 8.

Referring to FIGS. 8 and 9, another embodiment of a hanger support 51 is shown. Hanger support 51 includes a stem 52, arms 53 and 54, projecting outward from the stem 52 in opposite directions, and a lip 55 depending from a distal end of one of the arms 54 in the same direction as the stem 52 extends relative to the arms 53 and 54. A central hole 56 extends axially through stem 52 of the hanger support 51 and may or may not be threaded. A threaded set screw bore 58, extends through the lip 55 and a set screw 59 is threaded into the set screw bore 58. The set screw 59 may be of a type having an outer or first drive head 61, connected to an inner or second drive head 62 by a reduced diameter shank 63. The diameter of the shank 63 is sized such that the outer drive head 61 will shear off at the shank 63 when a selected amount of shear force or torque is applied thereto. The inner drive head 62 can be used to untighten the set screw 59 after the outer head 61 has been sheared off.

The hanger support 51 may be sized similar to hanger support 1, with the stem 52 having a transverse and longitudinal width that is approximately the same as the transverse width of the hanger support 51. In one embodiment for use with a truss 3 having a one inch gap 19, the transverse and longitudinal width of the stem 52 are each approximately ⅞ inches. A groove 65 formed between the stem 52 and lip 55 is approximately ⁷⁄₁₆ inches. The stem 52 extends or depends approximately ⅜ inches from the arms 53 and 54 and the stem extends or depends approximately ⅝ inches from the arm 54 to which it is connected. With reference to FIGS. 10-12, when the hanger support 51 is used with a truss 3 it may be installed and supported on the lower pair of angle irons 8 in a manner similar to installation of the hanger support 1. The stem 52 of hanger support 51 may be received in the gap 19 of the lower pair of angle irons 8 with the vertical leg 14 of one of the angle irons 8 extending into the groove 65. The set screw 59 can then be driven into abutting relationship with the vertical leg 14 in the groove 65 to draw the side of the stem 52 adjacent the groove against the side of the vertical leg 14 facing the gap 19 to clamp the hanger support 51 to the vertical leg 14. Securing the hanger support 51 to the angle irons 8 is particularly useful in areas with seismic activity such that the hanger supports 51 are less likely to be inadvertently rotated out of the transverse orientation relative to the angle irons 8 which would allow the hanger support 51 to fall back through the gap 19 between the angle irons 8.

As shown in FIG. 8, the hanger support 51 may also be used with or secured to a selected slotted strut channel 4. For example, a hanger support 51 with a stem 52 having a longitudinal width of approximately ⅞ inches and a groove 65 of approximately ⁷⁄₁₆ inches can be positioned with the stem 52 extending into the gap 26 between shoulders 24 and one of the shoulders 24 extending into the groove 65 with the lip 55 extending adjacent an outer side or edge of the strut 4. The set screw 59 is tightened against the outer side of the strut 4 to draw the side of the stem 52 adjacent the groove 65 against an inner surface of the shoulder 24 to clamp the hanger support 51 to the strut 4. As shown in FIG. 8, for exemplary purposes, a threaded stem 67 of a hanger, such as an eyelet 68 may be threaded into the threaded central hole 56 of the hanger support 51. In the example shown, the threaded stem 67 of the eyelet 68 extends up through one of the slots 28 in strut 4, with the hanger support 51 secured between the legs 22 of the strut 4 and the eyelet 68 extending below the web 21 of the strut 4.

Figure 13:
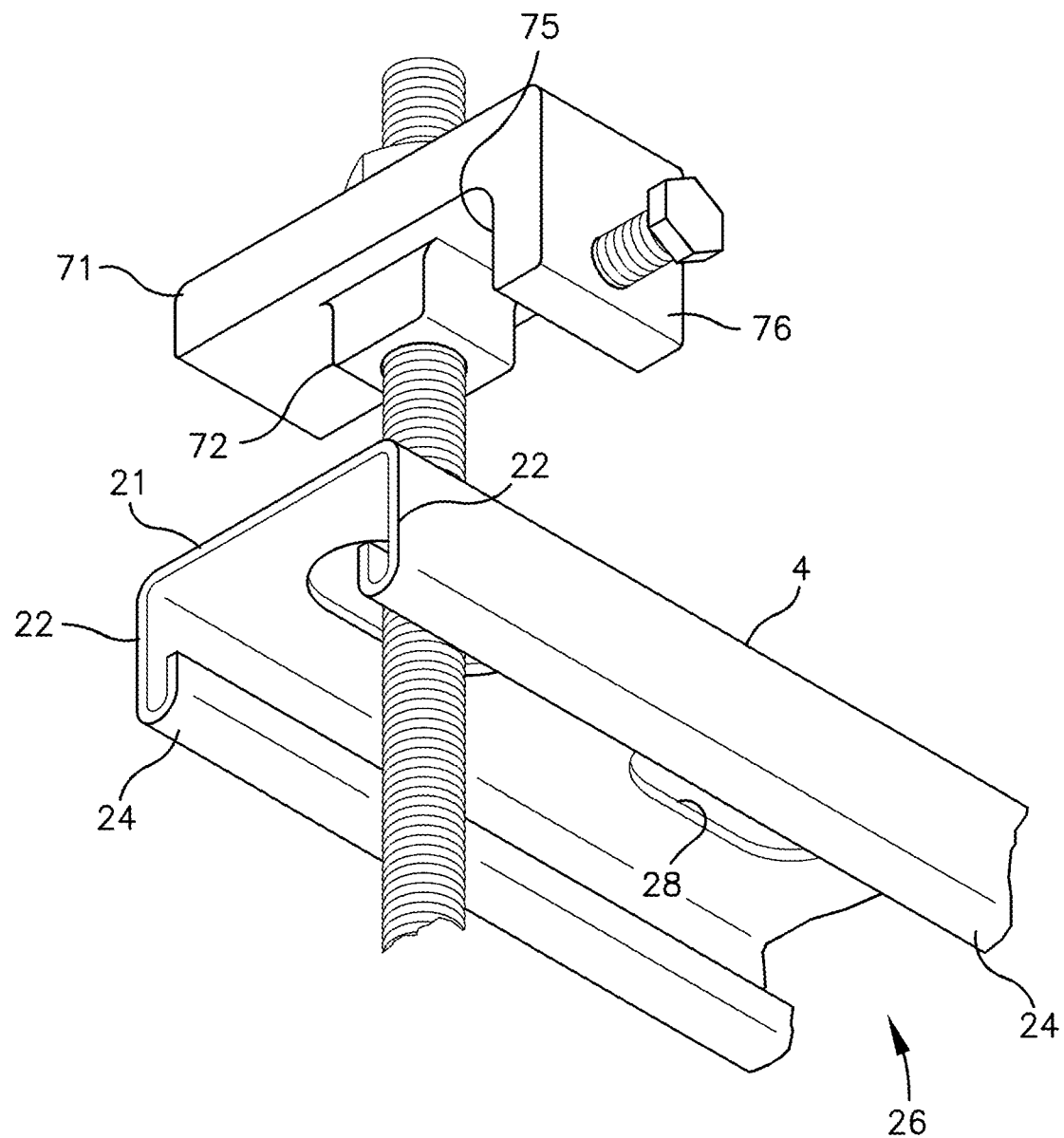
FIG. 13 is an exploded, perspective view of an alternative embodiment of the hanger support of FIG. 8 having a stem of reduced longitudinal and lateral widths sized to fit within one of a plurality of longitudinally aligned slots in a channel strut.

A modified version of hanger support 51 is shown in FIG. 13 as hanger support 71 having a rectangular stem 72 of reduced transverse and longitudinal width and therefore a wider groove 75 between the stem 72 and lip 76. The longitudinal width of the stem 72 is preferably sized to be smaller than the width of the slot 28 in a selected strut 4 and the groove 75 is wide enough to receive the portion of the web 21 of the strut 4 extending between a side of the slot 28 and the outer edge of the strut 4 along one of the legs 22 so that the stem 72 may be inserted in the slot 28 with the lip 76 extending along the outer edge of one of the legs 22 of the strut 4. In an embodiment sized for use with a truss (such as truss 3 in FIG. 1) having a gap 19 of one inch and with a strut 4 having a gap 26 between shoulders 24 of ⅞ inches, a slot 28 of ⅝ inches, and a spacing between the sides of each slot 28 and the outer edges of the strut 4 of approximately ½ an inch, the transverse and longitudinal width of the stem 72 are approximately ½ an inch each and the groove 75 between the stem 72 and lip 76 is approximately ⁹⁄₁₆ of an inch.

Figure 14:
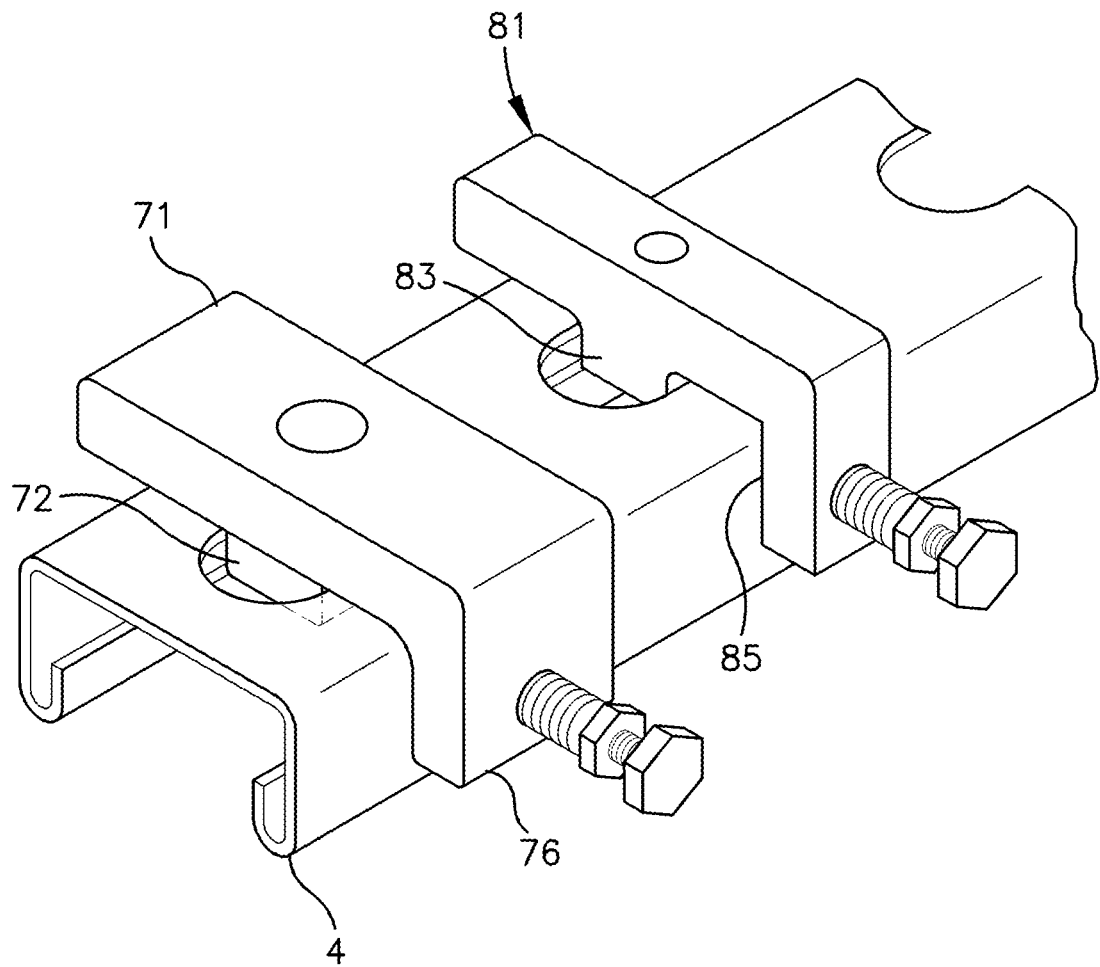
FIG. 14 is a perspective view of the channel strut as in FIG. 13 with the stem of the hanger support of FIG. 13 secured in one of the slots in the channel strut and showing a further alternative embodiment of the channel strut having a reduced lateral width and with a stem positioned in one of the slots in the channel strut.

A further modified version of hanger support 51 is shown in FIG. 14 as hanger support 81. Hanger support 81 is dimensioned or proportioned similar to hanger support 71, except that it is narrower in its transverse width. The hanger support 81 is sized so that the transverse width is the same as the width of the stem 83 which in the example described above is ½ an inch in both the longitudinal and transverse directions, while the groove 85 is ⁹⁄₁₆ of an inch.

Figure 15:
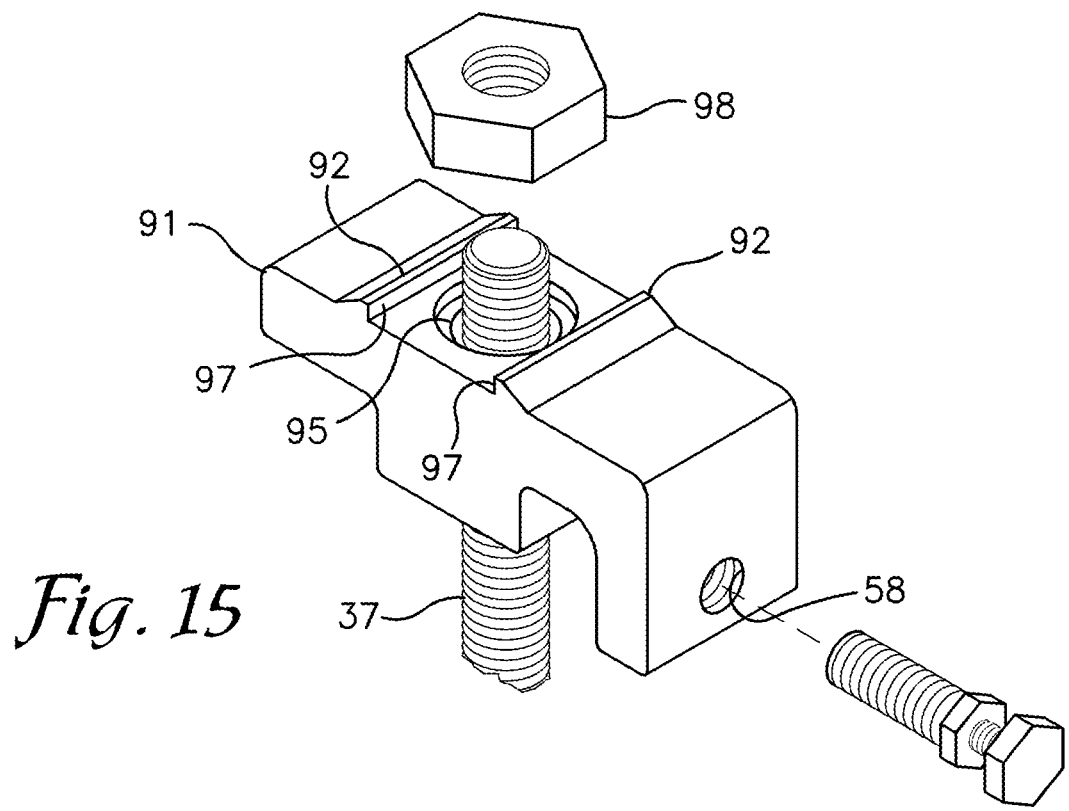
FIG. 15 is an exploded perspective view of an alternative embodiment of the hanger support as shown in FIGS. 8 and 9 having a pair of parallel faces formed on parallel ridges extending upward from an upper surface of the hanger support to receive and hold a nut to which a threaded rod is threadingly secured.
Figure 16:
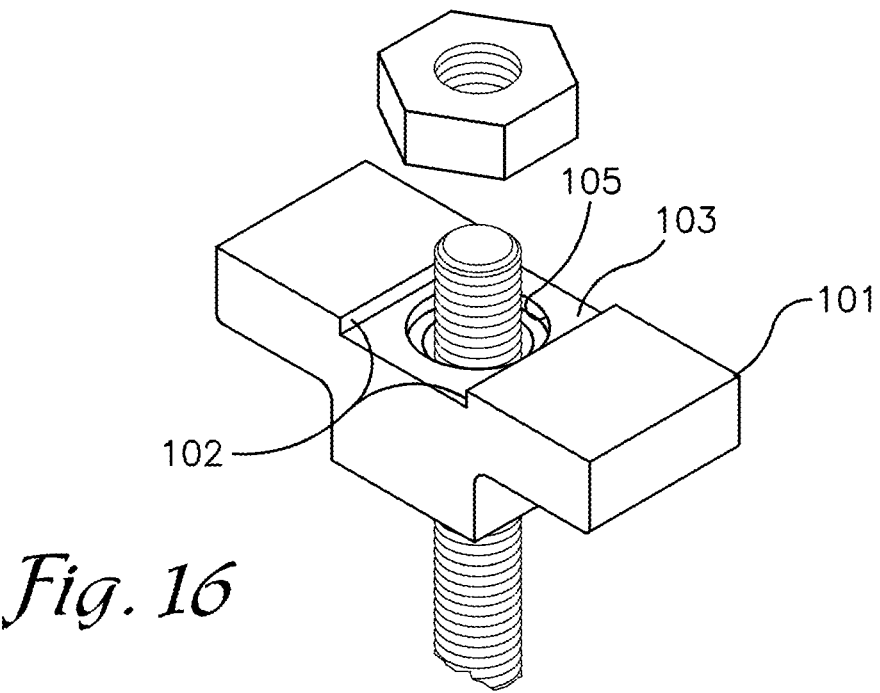
FIG. 16 is a view similar to FIG. 15 in which the parallel faces are formed along and define a recess in the hanger support.

A further alternative embodiment of the hanger support 51 is shown in FIG. 15 as hanger support 91 in which ridges 92 are formed on an upper surface of the hanger support 91 in parallel spaced relation on opposite sides of the central hole 95 and extending in alignment with the transverse width of the hanger support 91. The ridges 92 present opposingly facing flat surfaces 97 extending upward from or away from the upper surface of the hanger support 91 and are spaced apart a distance selected to receive a nut 98 therebetween centered over the central hole 95. The flat surfaces 97 of the ridges 92 are adapted to hold a nut 98 in position when an all thread rod 37 is threaded through the nut 98 or otherwise rotated. Flat surfaces may be included in each of the embodiments disclosed including in a T-shaped hanger support 101 similar in construction to hanger support 1 as shown in FIG. 16. In hanger support 101, the flat surfaces 102 are formed along the edges of a recess 103 formed in an upper surface of the hanger support surrounding the central hole 105 formed therein.

Figure 17:
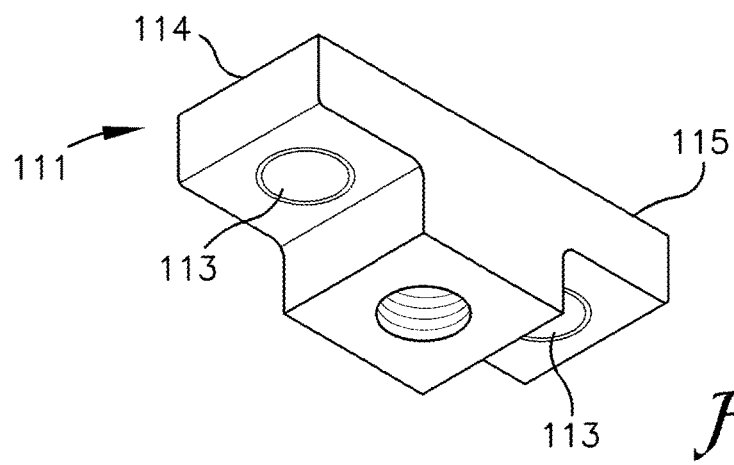
FIG. 17 is an alternative embodiment of the T-shaped hanger support as in FIGS. 1-7 with magnets embedded in the left and right arms of the hanger support.

A further alternative embodiment of the hanger support 1 is shown in FIG. 17 as hanger support 111. Hanger support 111 includes a magnet 113 embedded in each of the arms 114 and 115 of the hanger support 111. Each magnet 113 may be press fit into a bore formed in the underside of each arm 114 and 115. The magnets are particularly adapted for magnetically coupling to either the vertical legs 14 of the lower pair of angle irons 8 or the horizontal legs 15 of the upper pair of angle irons 8 to more securely connect the hanger support 111 thereto.

Figure 18:
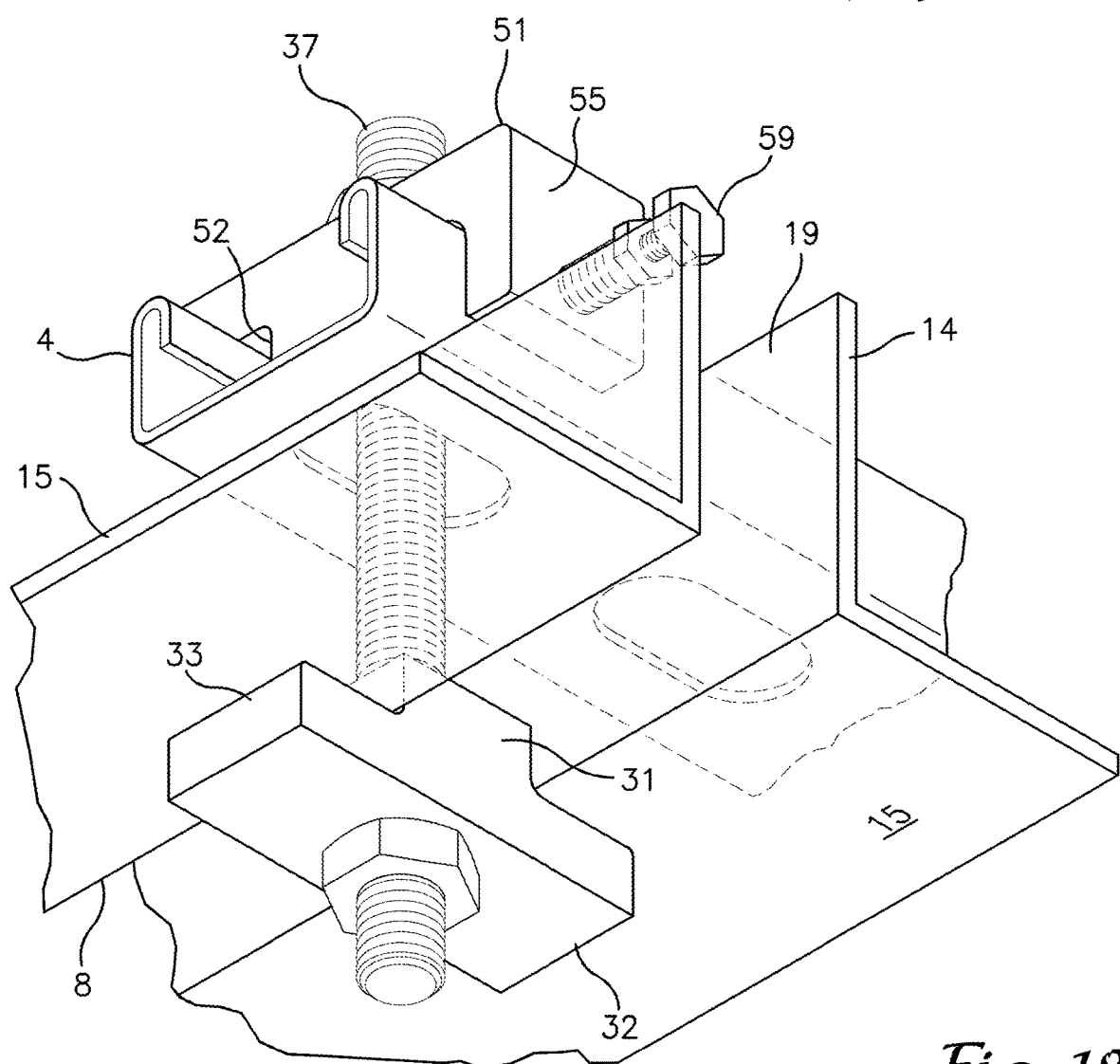
FIG. 18 is an enlarged and fragmentary view of a pair of angle irons forming the lower pair of angle irons of a truss or joist as in FIG. 1 with a channel strut supported on upper edges of vertical legs of the lower pair of angle irons and clamped between a hanger support of the type shown in FIG. 8 and a hanger support of the type shown in FIG. 7.

FIG. 18 shows a possible use of a hanger support 51 and hanger support 1 to clamp a strut channel 4 to a pair of angle irons 8 with a section of a threaded rod 37 threaded through each of the hanger supports 51 and 1.

Figure 19:
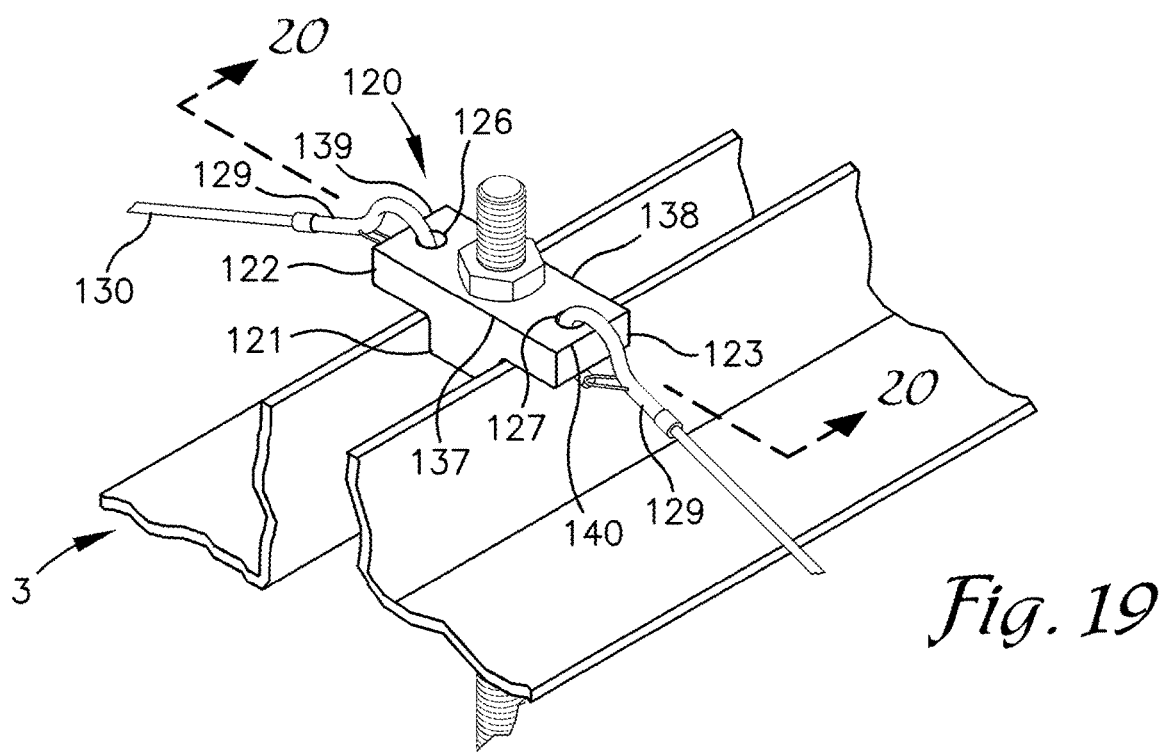
FIG. 19 is a fragmentary, perspective view of a section of a truss with modified embodiment of one of the T-shaped, hanger supports supported on a lower pair of angles irons forming the truss or joist with a threaded rod suspended from the hanger support and holes formed in arms of the hanger support for connecting hooks or other connectors thereto.
Figure 20:
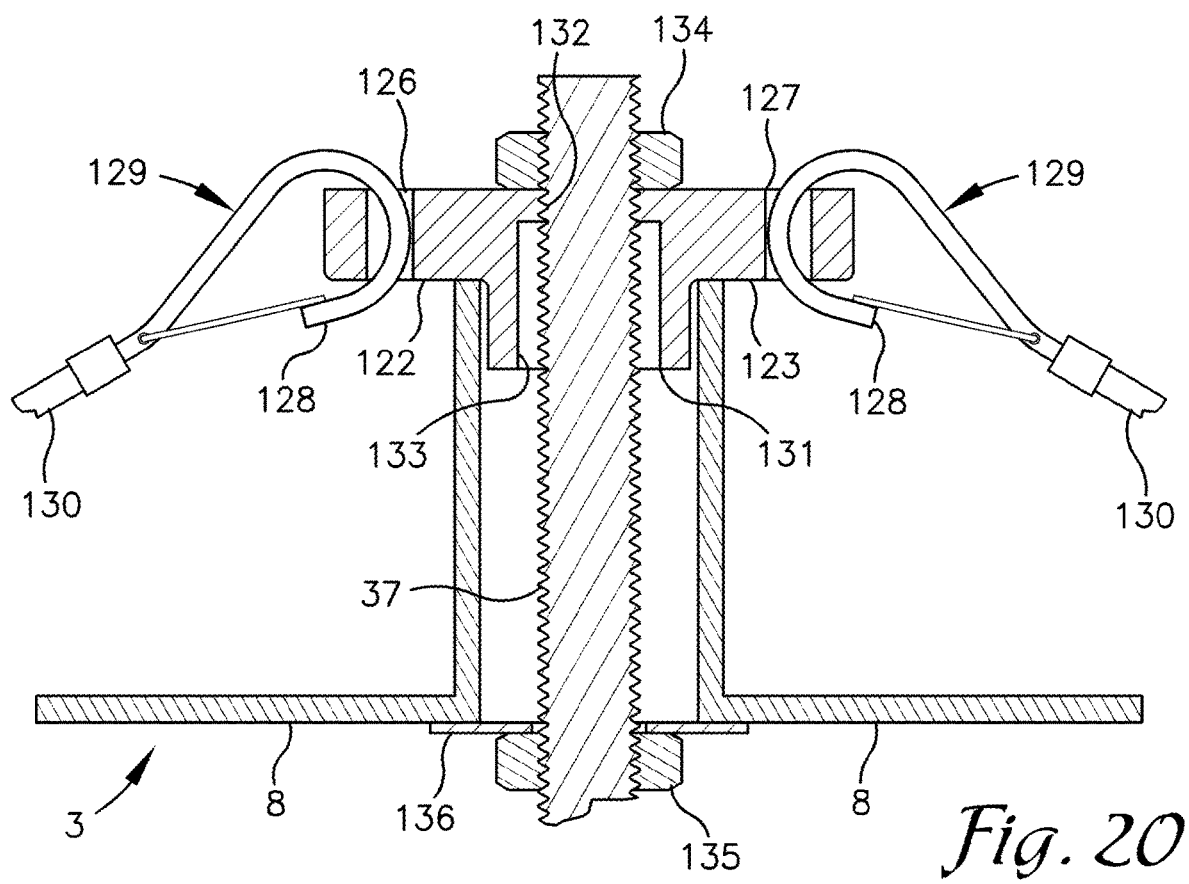
FIG. 20 is a cross sectional view of the modified T-shaped hanger support taken generally along line 20-20 of FIG. 19.

Referring to FIGS. 19 and 20, a modified T-shaped hanger support or hanger support 120 with stem 121 and arms 122 and 123 and holes and holes 126 and 127 extending through the arms 122 and 123 respectively. Although holes are shown formed through both arms 122 and 123 respectively, it is to be understood that only one hole could be formed in one of the arms 122 or 123. The holes 126 and 127 may be centered relative to the width and length of the respective arms 122 and 123 or, as in the embodiment shown, may be offset closer to a distal end of the arm 122 and 123 respectively and away from the stem 121. Each hole 126 and 127 is preferably sized, for example, to receive a hooked end 128 of a hook 129 mounted on the end of a cable 130 which is to be supported from the truss 3 by connection of hook 129 to the T-shaped hanger support 120. Other connectors of a variety of shapes, materials, and construction may be used with and secured within the holes 126 and 127 of the T-shaped hanger supports 120 for securing additional structure or supports to the truss 3 to which the T-shaped hanger support 120 is connected.

Figure 28:
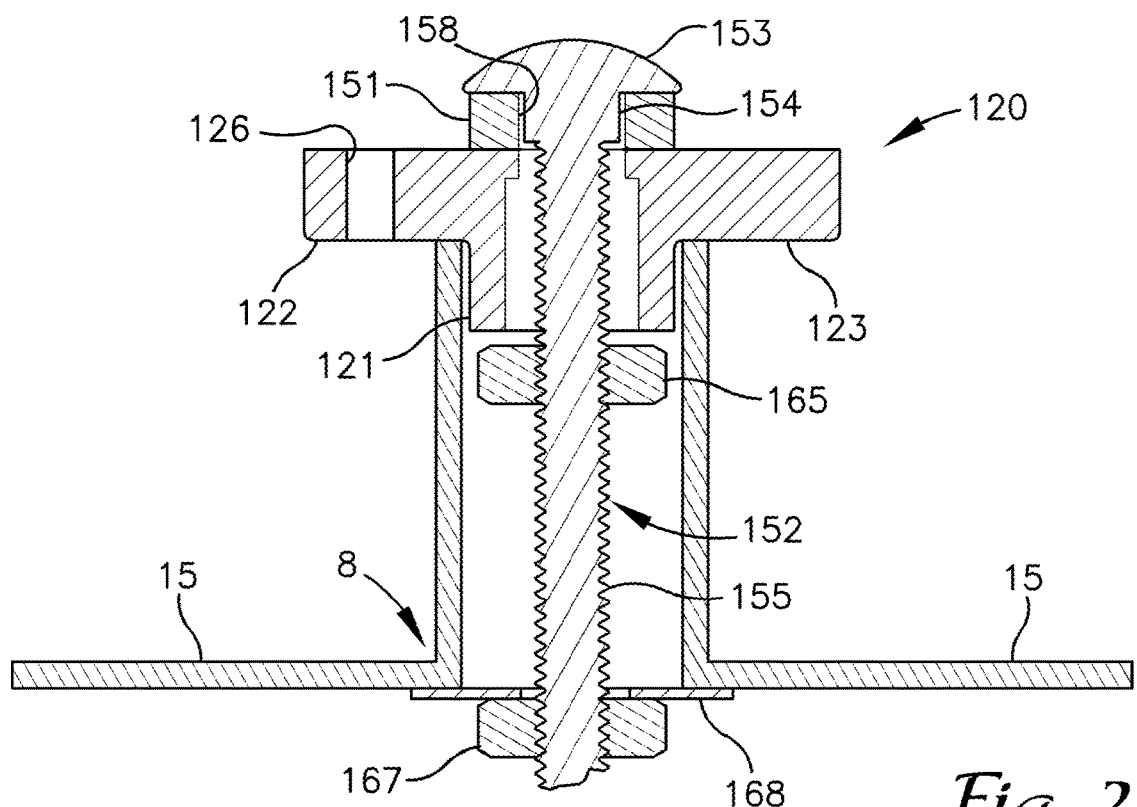
FIG. 28 is an enlarged cross-sectional view of the hanger support supported on the truss taken along line 28-28 of FIG. 27.
Figure 29:
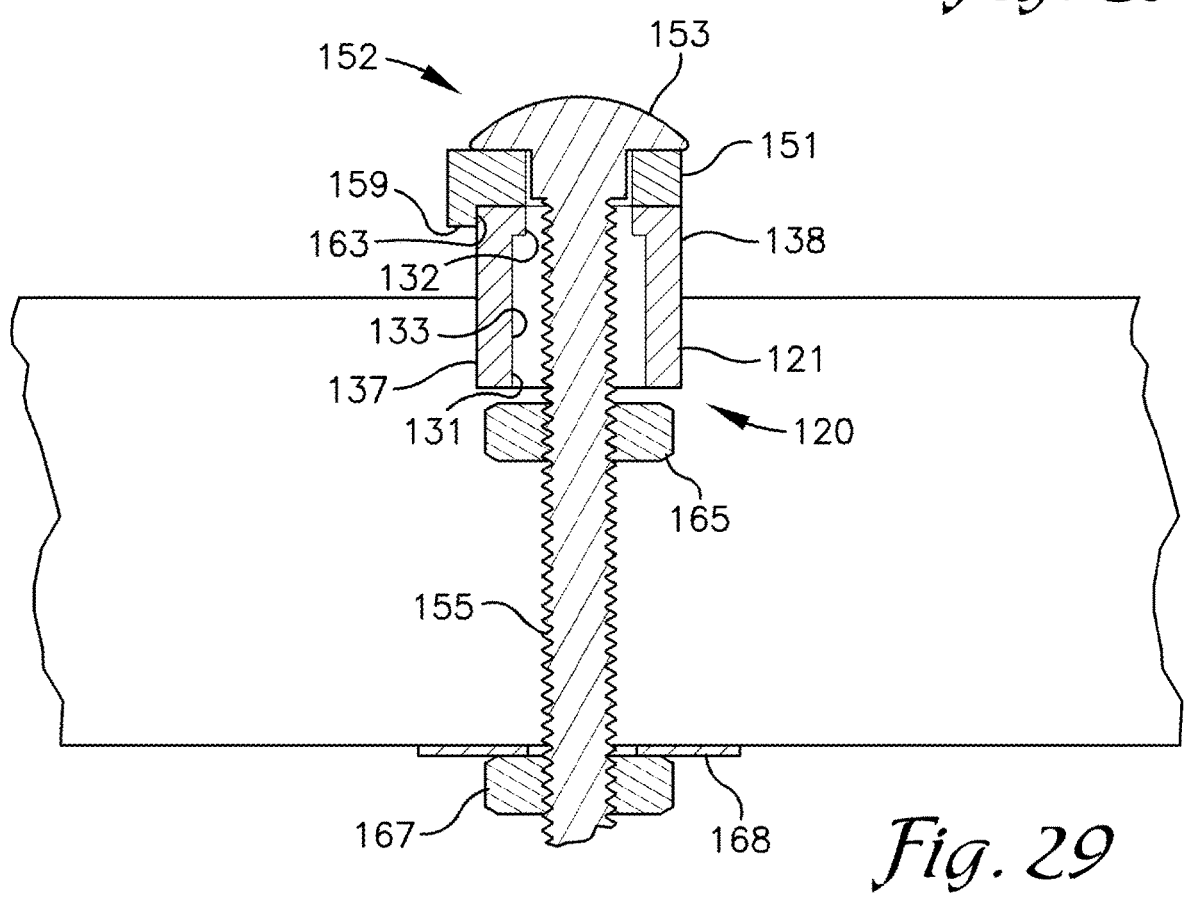
FIG. 29 is a cross-sectional view of the hanger support supported on the truss taken along line 29-29 of FIG. 27.

FIG. 20 is a cross-sectional view of one of the modified T-shaped hanger supports 120, secured between two lower angle irons 8, similar to the connection of hanger support 1 between angle irons 8 in FIG. 5. A central hole 131 of the modified T-shaped hanger support 120 is formed in two sections with an upper section 132 of the hole 131 having a smaller diameter than a lower section 133 of hole 132. The upper section 132 of the hole 131 may be sized with a diameter sized to receive a threaded all-thread rod, such as rod 37 shown in FIG. 5, threaded therethrough whereas the diameter of lower section 133 is appreciably larger than the diameter of the all-thread rod 37. As shown in FIGS. 28 and 29, the upper section 132 of the hole 131 may be formed without threads and sized to be larger in diameter than the stem of a bolt, whether threaded or not, including for example a carriage bolt as shown in FIGS. 28 and 29 or a bolt similar to bolt 44 with a smooth shank or neck 45 as shown in FIG. 6. In FIG. 20, nut 134 connected to the all-thread rod 37 extending through and above the T-shaped hanger support 120 and nut 135 and washer 136 connected to the all-thread rod 37 below horizontal legs 15 of angle irons 8 forming truss 3 are used to secure the T-shaped hanger support 120 between the lower angle irons 8. Central hole 131 is centered between longitudinal edges 137 and 138 and lateral edges 139 and 140 of the T-shaped hanger support 102.

Figure 21:
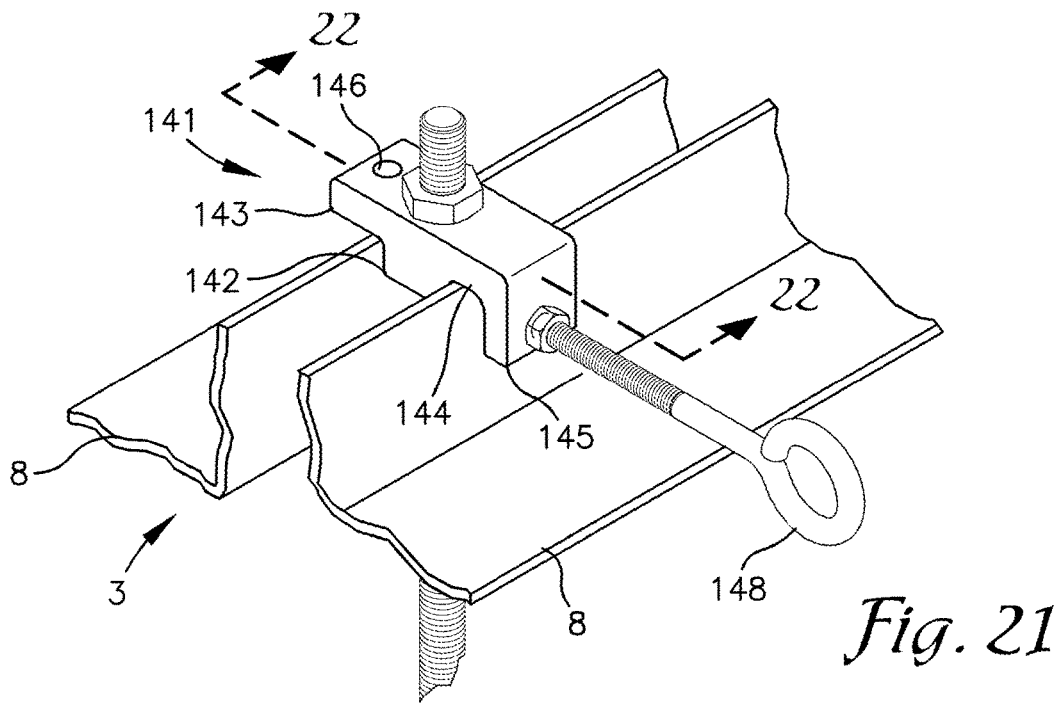
FIG. 21 is a fragmentary, perspective view similar to FIG. 19 showing a modified version of the hanger support having a lip depending from a distal end of one of the arms of the hanger support with a connector hole formed in an arm opposite the depending lip and a eyebolt threadingly secured in a threaded bore extending through the depending lip.
Figure 22:
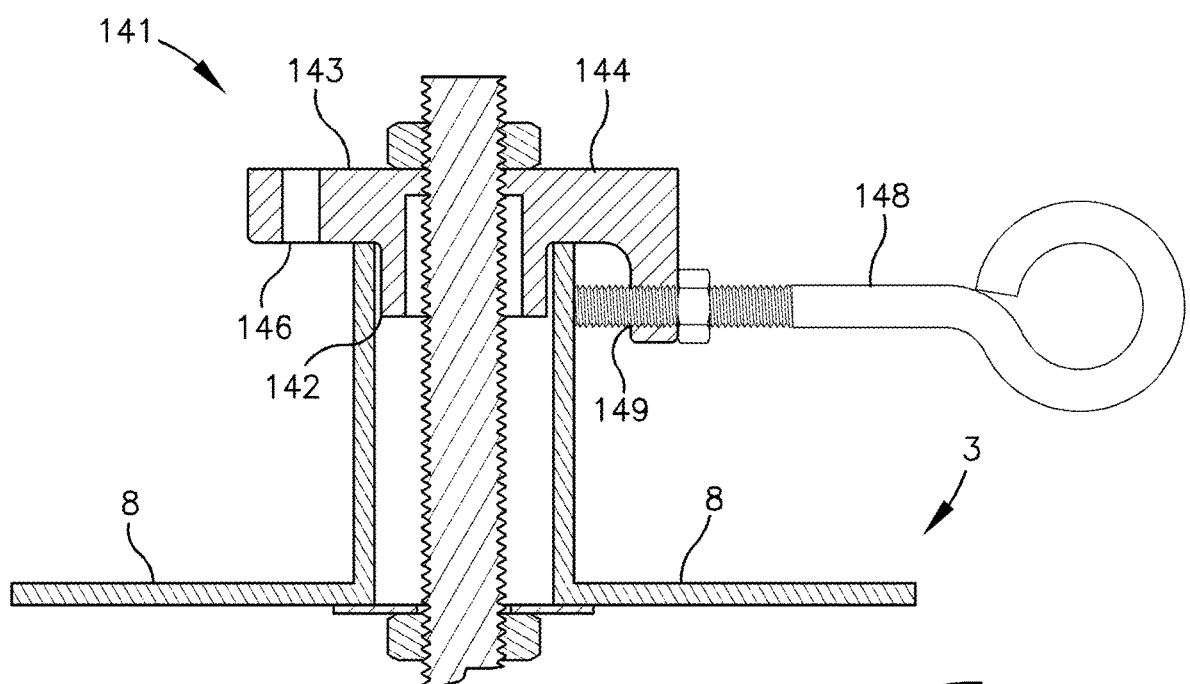
FIG. 22 is a cross-sectional view of the modified hanger support taken along line 22-22 of FIG. 21.

FIGS. 21 and 22 show a modified F-shaped hanger support 141 with stem 142, arms 143 and 144 and depending lip 145. A hole 146 extends through arm 143 on the side of the stem 142 opposite depending lip 145. Hole 146 may be used for securing a connector such as hook 129 (of the type shown in FIGS. 19 and 20) thereto when, for example, the F-shaped hanger support 141 is secured to the lower angel irons 8 of truss 3. Arm 143 of hanger support 141 may be formed relatively longer than arm 53 of hanger support 51 (See FIGS. 9-12) to allow room for forming the hole 146 therethrough. As shown in FIGS. 21 and 22 an eye-bolt 148 or other fastener or connector may be secured in threaded bore 149 of the F-shaped hanger support 141 and which may be enlarged relative to the set screw receiving bore 58 of F-shaped adapter 51.

Figure 23:
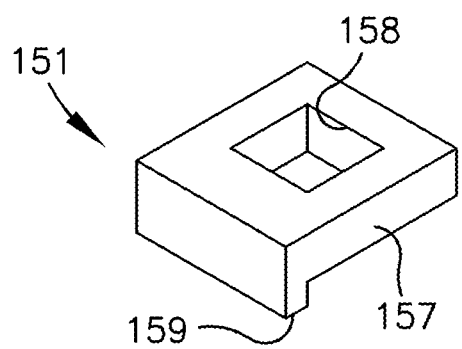
FIG. 23 is a top, perspective view of a lock washer for use in securing a carriage bolt relative to a hanger support.
Figure 24:
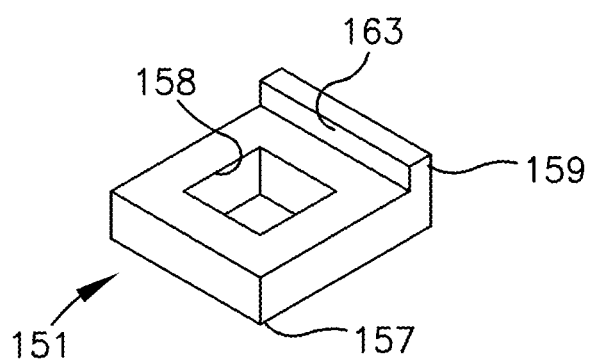
FIG. 24 is a bottom perspective view of the lock washer.

FIGS. 23 and 24 show a locking washer 151 adapted for use in connecting a carriage bolt 152 to a T-shaped hanger support, such as T-shaped hanger support 120 as shown in FIGS. 25-29. Carriage bolt 152 includes a domed head 153, a square neck 154 and a threaded shank 155 extending past the neck 154. Locking washer 151, as shown in FIGS. 23 and 24, includes a rectangular body 157 with a square hole 158 extending therethrough and a lip or lips 159 projecting downward along one edge of the washer body 157. The square hole 158 is sized just wider than the square neck 154 of the carriage bolt 152 with which the locking washer 151 is used to prevent or limit rotation of the square neck 154 and the carriage bolt 152 relative to locking washer 151 when square neck 154 of bolt 152 is positioned in or extends in the square hole 158.

The width of the body in a direction parallel to the edge along which the lip 159 projects preferably matches or is narrower than the width of the T-shaped hanger support 120, transverse to a longitudinal axis extending through the arms 122 and 123. The spacing or distance between a central axis through the center of the square hole 158 extending parallel to an inner face 163 of each lip 159 of locking washer 151 (see FIG. 24) is slightly greater than the distance from the center of central hole 131 to either longitudinal edge 137 and 138 of the t-shaped hanger support 102. In the embodiment shown, the length of the locking washer 151 from the central axis to the edge or end opposite the lip 159 is approximately equal to the distance form the center of the central hole 131 to either longitudinal edge 137 and 138.

Figure 27:
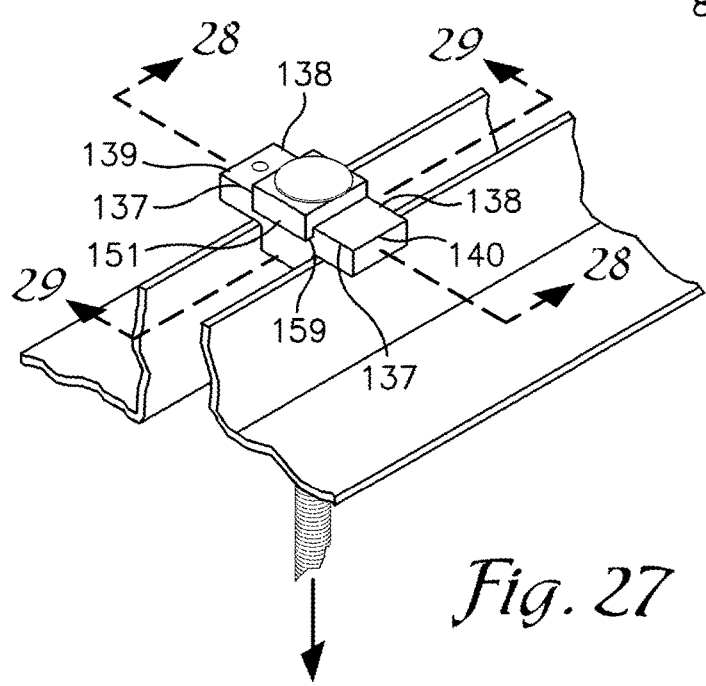
FIG. 27. is a view similar to FIG. 26 showing the hanger support lowered into engagement with the vertical legs of the lower pair of angle irons after having been rotated ninety degrees and with the lock washer rotated ninety degrees.

In use, and as best seen in FIGS. 27 and 29, the locking washer 151 can be positioned on top of a T-shaped hanger support 120 with an inner face 163 of the lip 159 abutting against one of the longitudinal edges 137 or 138 of the T-shaped hanger support 120 and the square hole 158 centered over the central hole 131 of the hanger support 120. With the stem 155 of a carriage bolt 152 extending through the central hole 131 and the square neck 154 of bolt 152 received within the square hole 158 of locking washer 151 and domed head 153 on top of the locking washer 151, the carriage bolt 152 cannot rotate relative to the locking washer 151 and the lip 159 on locking washer 151 prevent the locking washer 151 and the carriage bolt 152 cannot rotate relative to the T-shaped hanger support 120.

Figure 25:
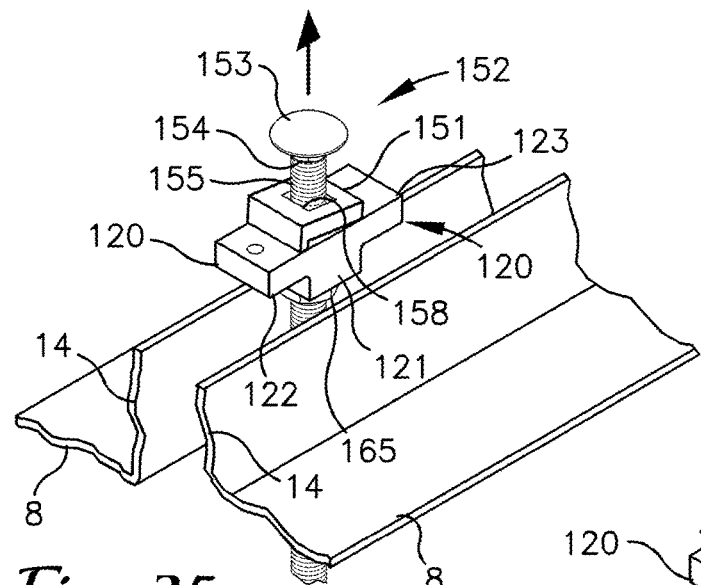
FIG. 25 is perspective view of the lower pair of angle irons forming the truss or joist showing one of modified hanger supports and lock washer mounted on a carriage bolt being passed upward between vertical legs of the lower pair of angle irons forming the truss.
Figure 26:
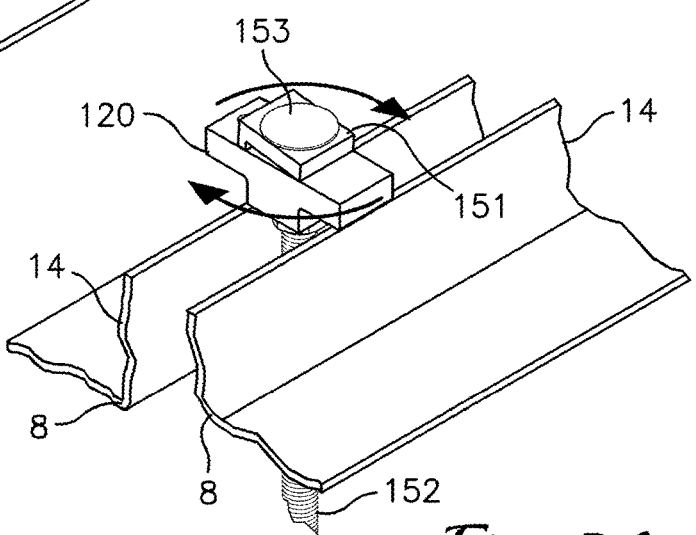
FIG. 26 is a view similar to FIG. 25 showing the hanger support rotated ninety degrees and the carriage bolt lowered relative to the lock washer and hanger support.

FIGS. 25-27 show steps for one approach to installing between and onto spaced apart angle irons 8 a T-shaped connecter 120 with a carriage bolt 152 and locking washer 151 loaded onto or in conjunction with the hanger support 120. As shown in FIG. 25, a locking washer 151 is slid onto the shank 155 of the carriage bolt 152 with the shank 155 extending through square hole 158 in washer 151 and the square neck 154 of bolt 152 extending into the square hole 158 or in close proximity thereto. A T-shaped hanger support 120 is then slid onto the shank 155 of the carriage bolt 152 below the locking washer 151. The locking washer 151 is oriented relative to the T-shaped hanger support 120 so that the lip 159 extends over one of the arms 122 or 123. A nut 165 is threaded onto the threaded shank 155 until the nut 165 reaches the upper most end of the thread of the threaded shank 155 or, as shown in FIGS. 25, 28 and 29, the nut 165 loosely abuts against a lower edge of the stem 121 of the T-shaped adaptor 120. The nut 165 is not tightened upward against the adaptor 120 so that the adaptor 120 may rotate relative to the carriage bolt 152.

The carriage bolt 152 with the adaptor 120 and locking washer 151 supported thereon above nut 165 is lifted to just below the gap between angle irons 8 and then the bolt 152 is rotated to rotate the T-shaped adaptor 120 until the longitudinal axis of the adapter 120 through arms 122 and 123 is aligned with the longitudinal axis of the gap between angle irons 8. The carriage bolt 152 with the adaptor 120 and locking nut 151 loosely supported thereon are lifted until the adapter 120 and locking nut 151 extend above the vertical legs 14 of angle irons 8. As indicated in FIG. 26, the carriage bolt 152 is rotated to cause the T-shaped adaptor 120 to rotate ninety degrees until the arms 122 and 123 extend transverse to and over the vertical legs 14 of angle irons 8. The carriage bolt 152 and the T-shaped 120 and locking washer 151 are allowed to drop down until the arms 122 and 123 of T-shaped hanger support 120 are supported on the vertical legs 14 of angle irons 8. The carriage bolt 152 is further rotated to rotate the locking washer 151 relative to hanger support 120 ninety degrees until the lip 159 extends adjacent one of the longitudinal edges 137 or 138 of the hanger support 120 and the lip 159 drop down across the longitudinal edge 137 or 138. Abutment of the lip 159 against the longitudinal edge 137 or 138 prevents rotation of the locking washer 151 relative to the T-shaped hanger support 120 and the extension of the square neck 154 of carriage bolt 152 in square hole 158 of locking washer 151 prevents rotation of the carriage bolt 152 relative to the locking washer 151. As shown in FIG. 28, a clamping nut 167 and clamping washer 168 may be threaded up the threaded shank 155 of the carriage bolt 152 with the washer 168 engaging the horizontal legs 15 of the angle irons 8 to fixedly secure the T-shaped hanger support 120 to the angle irons 8.

Each of the hanger supports shown and described, including hanger supports 1, 41, 51, 71, 81, 91, 101, 120 and 141 are each preferably monolithic and may be formed from a variety of methods including metal powder molding, casting or an extrusion and cutting process. The hole through the stem may be machined in or, if smooth may be formed in the molding process. The set screw receiving bore in the embodiments with the lip would be machined into the lip. The body of hanger support 111 is also formed as a monolithic part with the magnets 113 press fit into bores machined into the arms 114 and 115. The locking washer 151 may also be formed by metal powder molding or extrusion and machining processes.

Figure 30:
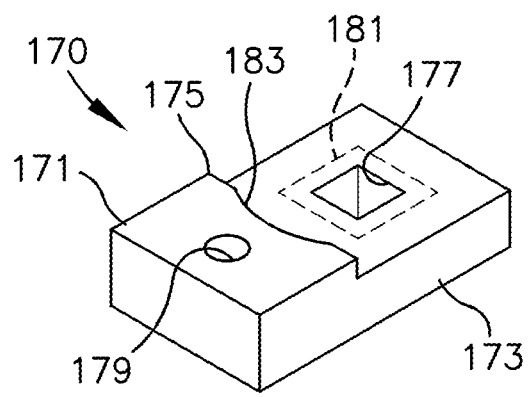
FIG. 30 is a bottom perspective view of an alternative embodiment of a lock washer.
Figure 31:
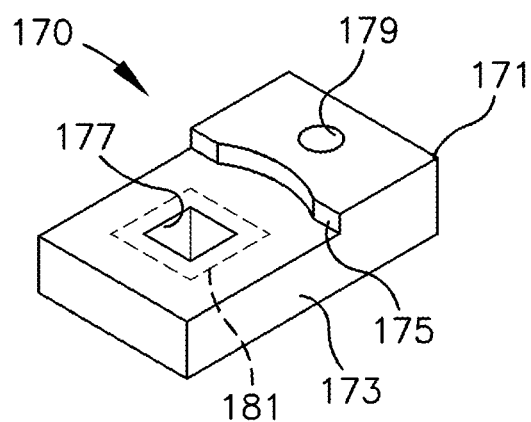
FIG. 31 is a bottom perspective view of the lock washer as in FIG. 30 from an opposite side thereof.

FIGS. 30 and 31 disclose a modified version of a locking washer 170 having a tab 171 formed as part of the locking washer 170 as an extension of a washer body 173 and lip or shoulder 175. The tab 171 extends from the lip 175 on a side thereof opposite square hole 177 in the locking washer 170. A hole 179 is formed in and extends through tab 171 and is sized to receive a connector such as hooked end 128 of hook 129, similar to the connection of hook 129 to hanger support 120 in FIGS. 19 and 20. The hole 179 in tab 171 on locking washer 170 is positioned to allow a hook 129 or other connector connected thereto to extend in the gap between vertical legs 14 of angle irons 8. The axis of connector receiving hole 179 extends in parallel relationship with the axis through square hole 177.

Dashed lines 181 are included to indicate that the size of the square hole 177 formed in the locking washer 170 can be varied to receive carriage bolts 152 of different sizes with different sized square necks 154. A curved edge or curved recess 183 is formed in the surface forming lip 175 to accommodate the rounded edge of a domed head 153 of a carriage bolt 152, such as a larger carriage bolt 152 if the square hole 177 is sized to receive a larger carriage bolt 152. The recess 183 is included for applications in which the washer 170 is oriented with the lip 175 extending upward and not used to abut a longitudinal edge 137 or 138 of a hanger support such as hanger support 120 to prevent rotation.

Figure 32:
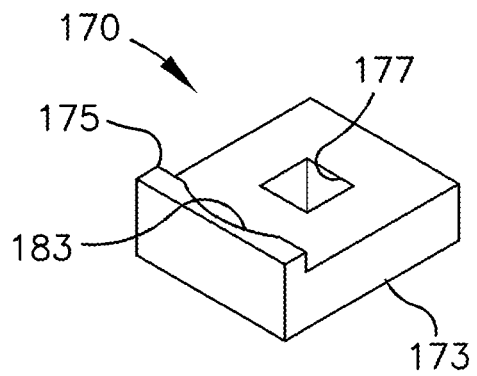
FIG. 32 is a bottom perspective view of an alternative embodiment of the lock washer.
Figure 33:
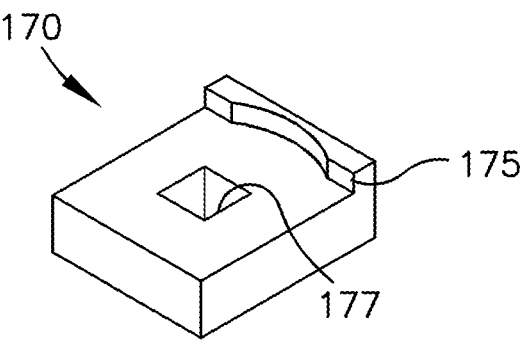
FIG. 33 is a bottom perspective view of the lock washer as in FIG. 32 from an opposite side thereof.

FIGS. 32 and 33 show the locking washer 170 formed without the tab 171. As an example, the locking washer 170 shown in FIGS. 30 and 31 could be formed from a metal powder molding process. Inserts, inserted in the mold, could them be used to reduce the overall length of the washer 170 eliminating the tab 171 or varying the size of the square hole 177.

Figure 34:
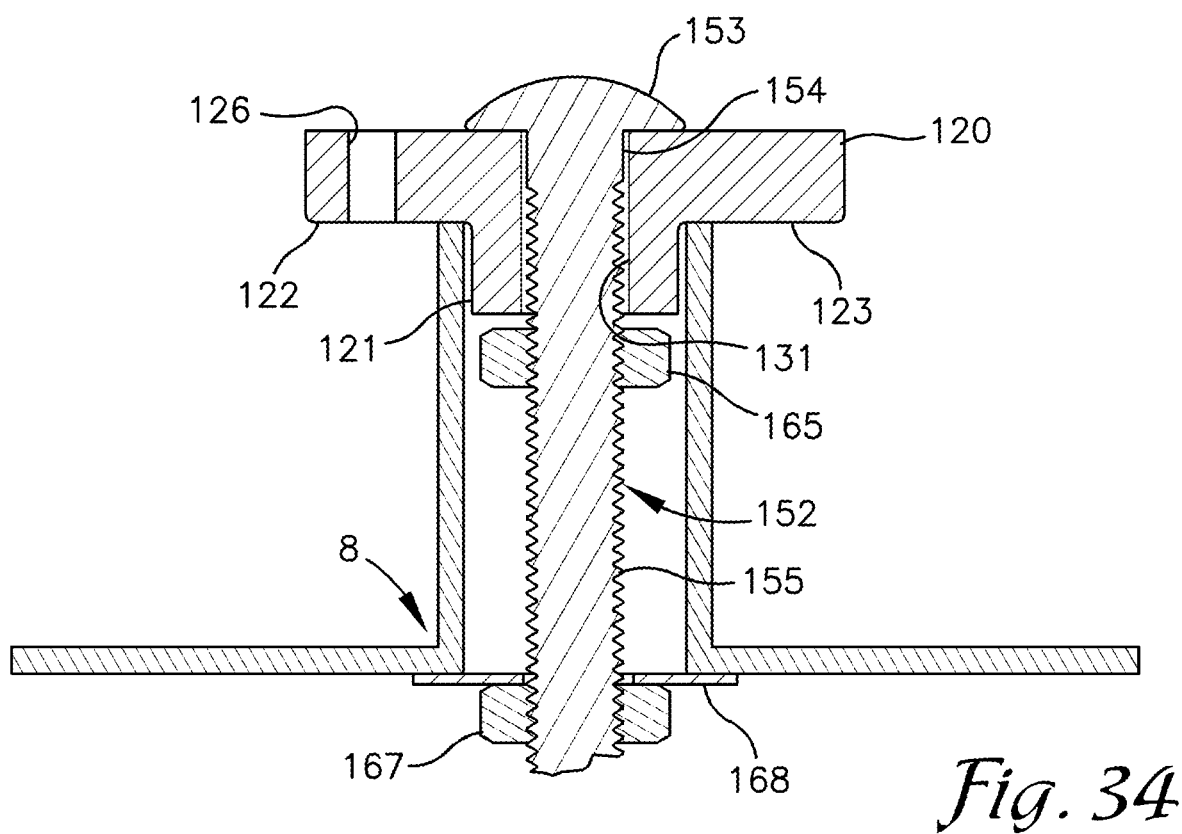
FIG. 34 is a view similar to FIG. 28, showing an enlarged cross-sectional view of a modified hanger support supported on the truss with a square cross-section hole in which the carriage bolt is received.
Figure 35:
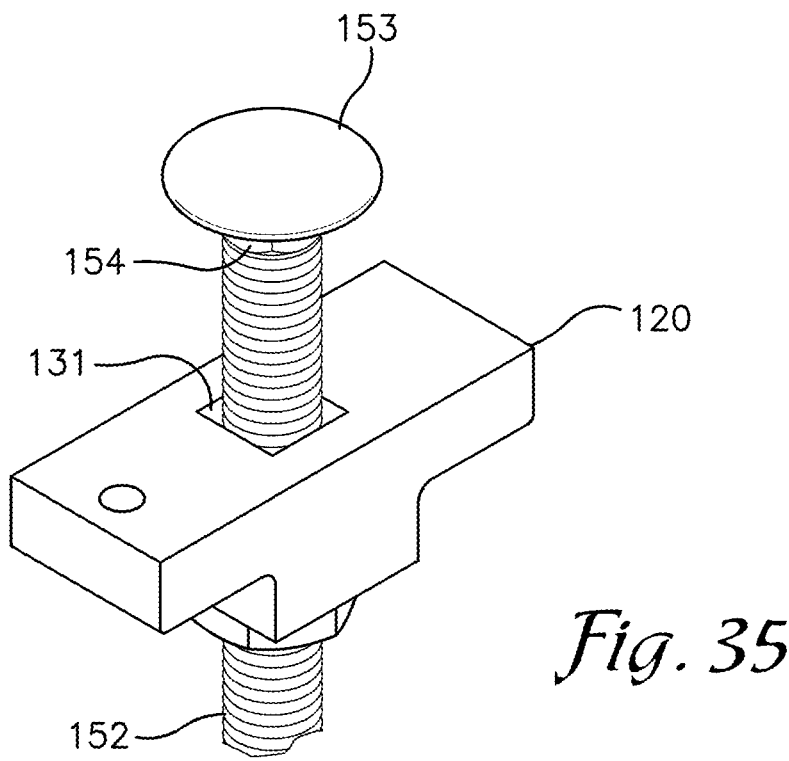
FIG. 35 is a top, perspective view of the hanger support as shown in FIG. 34 with the carriage bolt partially inserted in the square cross-section hole.

FIGS. 34 and 35 show a slightly modified version of the hanger support 120 in which the hole 131 through the hanger support 120 is square in cross-section its entire length with the width of the hole 131 in either direction just slightly wider than the neck 154 of a carriage bolt 152 with which it is sized for use.

Referring to FIG. 37, the stem 31 of hanger support 1 is shown extending into the gap 19 between vertical legs 14 of lower pairs of angle irons 8. The maximum longitudinal width of the stem 31, taken at any point between the faces of the stem 31 in the longitudinal direction, is narrower than the width of the gap 19. The corners 38a and b form first and second abutment features projecting radially outward from the central axis of the stem 31 at an acute angle relative to and on opposite sides of a longitudinal axis through the stem 31. Corners 38c and d form third and fourth abutment features projecting radially outward from the central axis of the stem 31 at an acute angle relative to and on opposite sides of a longitudinal axis through the stem 31 and on a side of the stem opposite corners 38a and b. Each of the corners or abutment features 38a-d extend radially outward from the central axis of the stem by a distance that exceeds half the width of the gap 19. When the hanger support 1 is oriented with the stem 31 extending within the gap 19 and the first and second arms 32 and 33 extending over the vertical legs 14 of the first and second angle irons of the upper or lower pairs of angle irons 6 and 8, rotation of hanger support 1 advances opposite corners 38a and 38c or 38b and 38d (depending on the direction of rotation) into engagement with the opposed vertical legs 14 of the upper or lower pairs of angle irons 6 or 8 to limit rotation of the hanger support 1 relative to the vertical legs 14 of the pair of angle irons 6 or 8.

It is foreseen that the abutment features could take the form of radial projections projecting outward from a cylindrical stem. It is also foreseen that three such abutment features could function to limit rotation of the stem within the gap 19. For example, two abutment features each extending outward from the central axis of the stem at an acute angle relative to and on opposite sides of a longitudinal axis through the stem by a distance that exceeds half the width of the gap 19 and extending toward an adjacent vertical leg 14 of one of the angle irons in combination with a third abutment feature extending along the longitudinal axis of the stem on a side of the stem opposite the first and second abutment features. With each abutment feature extending in close proximity to an adjacent vertical leg 14 of the pair of angle irons 6, the abutment features would limit rotation of the stem relative to the vertical legs 14. In a preferred embodiment the first and second abutment features would extend at an acute angle of approximately forty five degrees from the longitudinal axis of the stem, but smaller acute angles would also suffice.

It is to be understood that while certain forms of the present invention have been illustrated and described herein, it is not to be limited to the specific forms or arrangement of parts described and shown. As used in the claims, identification of an element with an indefinite article "a" or "an" or the phrase "at least one" is intended to cover any device assembly including one or more of the elements at issue. Similarly, references to first and second elements is not intended to limit the claims to such assemblies including only two of the elements, but rather is intended to cover two or more of the elements at issue. Only where limiting language such as "a single" or "only one" with reference to an element, is the language intended to be limited to one of the elements specified, or any other similarly limited number of elements.

What is claimed is:

1. A hanger support in combination with a hanger and a truss or joist formed from upper and lower pairs of angle irons, a first angle iron of each of said upper and lower pairs of angle irons comprising a vertical leg disposed substantially longitudinally parallel to a vertical leg of a second angle iron of each of said upper and lower pairs of angle irons with a gap formed therebetween; said hanger support including a stem and first and second arms extending laterally outward relative to said stem along a longitudinal axis and with a central hole extending through said hanger support in axial alignment with a central axis of said stem; the hanger connected to the hanger support with an upper end of the hanger extending into or through the central hole extending through the hanger support; said hanger support, including said stem, having a maximum transverse width that is narrower than the width of the gap; said stem having a maximum longitudinal width that is narrower than the width of the gap; said stem including at least first and second abutment features projecting radially outward from the central axis of said stem at an acute angle relative to and on opposite sides of a longitudinal axis through said stem, each of said abutment features extending radially outward from the central axis of said stem by a distance that exceeds half the width of the gap, such that the hanger support is sized to pass through the gap between the vertical legs of the first and second angle irons of the upper or lower pairs of angle irons when the hanger support is oriented with the longitudinal axis of the hanger support extending parallel to a longitudinal axis of the gap and when the hanger support is subsequently rotated ninety degrees and lowered relative to the vertical legs of the first and second angle irons of the upper or lower pairs of angle irons, the stem extends within the gap and the first and second arms extend over the vertical legs of the first and second angle irons of the upper or lower pairs of angle irons and the at least first and second abutment features engage the vertical leg of a first of the first or second angle iron upon rotation of the hanger support about the central axis of said stem to limit rotation of said hanger support relative to the first and second angle irons and the hanger extends below the first and second angle irons.

2. The hanger support of claim 1 wherein said stem includes at least a third abutment feature on a portion of the stem opposite the first and second abutment features, the third abutment feature cooperating with the first and second abutment features to limit rotation of said hanger support relative to the first and second angle irons when the stem is inserted within the gap.

3. The hanger support of claim 1 wherein said stem includes third and fourth abutment features extending on a side of said stem opposite the first and second abutment features wherein a length of a first diagonal extending through the first and third abutment features and a length of a second diagonal extending through the second and fourth abutment features each exceed the width of the gap.

4. The hanger support of claim 1 wherein said central hole is threaded along at least a portion of its length.

5. The hanger support of claim 1 wherein the hanger support is monolithic.

6. The hanger support of claim 1 wherein said stem is shorter than a depth of the gap between the vertical legs of the first and second angle irons of the upper or lower pairs of angle irons.

7. The hanger support of claim 1 wherein each of the first and second arms has a magnet embedded therein.

8. The hanger support of claim 1 further comprising a lip depending from a distal end of one of the arms and forming a groove between the stem and the lip; the lip having a threaded bore extending therethrough with a set screw or threaded connector threadingly secured within the threaded bore through the lip.

9. The hanger support of claim 1 wherein the stem of the hanger support has a longitudinal width which allows the stem of the hanger support to be inserted in a space between shoulders of a strut channel.

10. The hanger support of claim 8 wherein the stem of the hanger support has a longitudinal width which allows the stem of the hanger support to be inserted in a space between first and second shoulders of a strut channel of a type having a web and first and second spaced apart legs projecting transverse to the web on opposite sides thereof with the first and second shoulders extending inward from the first and second legs respectively, and wherein the groove between the stem and the lip of the hanger support is wide enough to receive either of the first or second legs and a respective first or second shoulder of the strut channel with the threaded bore in the lip extending in alignment with the first or second leg of the strut channel received within the groove.

11. The hanger support of claim 1 wherein a hole is formed through at least one of the first and second arms in parallel axial alignment with the central hole.

12. A hanger support adapted for use in association with a truss or joist formed from upper and lower pairs of angle irons, a first angle iron of each of said upper and lower pairs of angle irons comprising a vertical leg disposed substantially longitudinally parallel to a vertical leg of a second angle iron of each of said upper and lower pairs of angle irons with a gap formed therebetween; said hanger support including a stem and first and second arms extending laterally outward relative to said stem along a longitudinal axis and with a central hole extending through said hanger support in axial alignment with a central axis of said stem; said hanger support, including said stem, having a maximum transverse width that is narrower than the width of the gap; said stem having a maximum longitudinal width that is narrower than the width of the gap; said stem including at least first and second abutment features projecting radially outward from the central axis of said stem at an acute angle relative to and on opposite sides of a longitudinal axis through said stem, each of said abutment features extending radially outward from the central axis of said stem by a distance that exceeds half the width of the gap, such that the hanger the hanger support is sized to pass through the gap between the vertical legs of the first and second angle irons of the upper or lower pairs of angle irons with the hanger support oriented such that the longitudinal axis of the hanger support extends parallel to a longitudinal axis of the gap and when the hanger support is subsequently rotated ninety degrees and lowered, the stem extends within the gap and the first and second arms extend over the vertical legs of the first and second angle irons of the upper or lower pairs of angle irons and the at least first and second abutment features engage the vertical leg of a first of the first or second angle iron upon rotation of the hanger support about the central axis of said stem to limit rotation of said hanger support relative to the first and second angle irons; a locking washer for use with a carriage bolt having a threaded stem, a square neck and a domed head wherein the locking washer includes a rectangular body, a square hole extending through the rectangular body and sized to receive the square neck of the carriage bolt used therewith and prevent or allow only limited rotation of the square neck and carriage bolt relative to the locking washer, and a lip extending along an edge of the rectangular body, the width of the rectangular body in a direction parallel to the edge along which the lip extends is no wider than the width of the hanger support, transverse to a longitudinal axis extending through the first and second arms, the spacing between a central axis extending through a center of the square hole and extending parallel to an inner face of the lip is slightly greater than the distance from the center of the central hole in the hanger support to a longitudinal edge of the hanger support.

13. The hanger support in combination with the locking washer as in claim 12 wherein a tab extends outward from the lip of the locking washer and a connector receiving hole is formed through the tab with an axis of the connector receiving hole extending in parallel spaced relationship with an axis extending through the square hole in the locking washer.

14. A hanger support in combination with a hanger and a truss or joist formed from upper and lower pairs of angle irons, a first angle iron of each of said upper and lower pairs of angle irons comprising a vertical leg disposed substantially longitudinally parallel to a vertical leg of a second angle iron of each of said upper and lower pairs of angle irons with a gap formed therebetween; said hanger support including a stem and first and second arms extending laterally outward relative to said stem and with a central hole extending through said hanger support in axial alignment with a central axis of said stem; the hanger connected to the hanger support with an upper end of the hanger extending into or through the central hole extending through the hanger support; said stem having a rectangular cross-section perpendicular to a central axis of the central hole therethrough with first and second diagonals through the rectangular cross-section that are longer than the gap formed between the vertical legs of the upper and lower pairs of angle irons; said hanger support having a maximum transverse width that is narrower than the width of the gap and having a length along a longitudinal axis that is longer than the width of the gap such that the hanger support is sized to pass through the gap between the vertical legs of the first and second angle irons of the upper or lower pairs of angle irons when the hanger support is oriented with the longitudinal axis of the hanger support extending parallel to a longitudinal axis of the gap and when the hanger support is subsequently rotated ninety degrees and lowered relative to the vertical legs of the first and second angle irons of the upper or lower pairs of angle irons, the stem extends within the gap and the first and second arms extend over the vertical legs of the first and second angle irons of the upper or lower pairs of angle irons and the hanger extends below the first and second angle irons.

15. The hanger support as in claim 14 wherein opposite corners of the stem abut against the vertical legs of the first and second angle irons upon rotation of the hanger support about the central axis of said stem in a first or a second direction to limit rotation of said hanger support relative to the first and second angle irons in the first or second direction.

16. The hanger support of claim 14 wherein a hole is formed through the first arm in parallel axial alignment with the central hole.

17. The hanger support of claim 14 in combination with a locking washer for use with a carriage bolt having a threaded stem, a square neck and a domed head wherein the locking washer includes a rectangular body, a square hole extending through the rectangular body and sized to receive the square neck of the carriage bolt used therewith and prevent or allow only limited rotation of the square neck and carriage bolt relative to the locking washer, and a lip extending along an edge of the rectangular body, the width of the rectangular body in a direction parallel to the edge along which the lip extends is no wider than the width of the hanger support, transverse to a longitudinal axis extending through the first and second arms, the spacing between a central axis extending through a center of the square hole and extending parallel to an inner face of the lip is slightly greater than the distance from the center of the central hole in the hanger support to a longitudinal edge of the hanger support.

18. The hanger support in combination with the locking washer as in claim 17 wherein a tab extends outward from the lip of the locking washer and a connector receiving hole is formed through the tab with an axis of the connector receiving hole extending in parallel spaced relationship with an axis extending through the square hole in the locking washer.

19. A method of hanging an article from a truss or joist of the type formed from upper and lower pairs of angle irons, a first angle iron of each of said upper and lower pairs of angle irons comprising a vertical leg disposed substantially longitudinally parallel to a vertical leg of a second angle iron of each of said upper and lower pairs of angle irons with a gap formed therebetween, the method comprising the steps of:

providing a hanger support adapted for use in association with the truss or joist, said hanger support including a stem and first and second arms extending laterally outward relative to said stem along a longitudinal axis and with a central hole extending through said hanger support in axial alignment with a central axis of said stem; said hanger support, including said stem, having a maximum transverse width that is narrower than the width of the gap; said stem having a maximum longitudinal width that is narrower than the width of the gap;

providing a hanger;

connecting the hanger to the hanger support with an upper end of the hanger extending into or through the central hole in the hanger support and the hanger support oriented with the stem projecting downward relative to the first and second arms;

orienting the longitudinal axis of the hanger support to extend parallel to a longitudinal axis of the gap between the vertical legs of the first and second angle irons of the upper or lower pairs of angle irons;

passing the hanger support upward through the gap between the vertical legs of the first and second angle irons of the upper or lower pairs of angle irons until the hanger support extends above the vertical legs of the first and second angle irons;

thereafter rotating the hanger support ninety degrees and lowering the hanger support until the stem extends within the gap and the first and second arms extend over the vertical legs of the first and second angle irons of the upper or lower pairs of angle irons and the hanger extends partially below the first and second angle irons.

20. The hanger support of claim 1 wherein a hole is formed through the first arm in parallel axial alignment with the central hole.

* * * * *